US009513367B2

(12) United States Patent
David et al.

(10) Patent No.: US 9,513,367 B2
(45) Date of Patent: Dec. 6, 2016

(54) IMAGE GATED CAMERA FOR DETECTING OBJECTS IN A MARINE ENVIRONMENT

(75) Inventors: Ofer David, Haifa (IL); Yehuda Akiva Barukh, Kiryat-Motzkin (IL); Keren Bennet, Kerem-Maharal (IL); Alon Sade, Cfar Bialik (IL)

(73) Assignee: ELBIT SYSTEMS LTD., Haifa (IL)

( * ) Notice: Subject to any disclaimer, the term of this patent is extended or adjusted under 35 U.S.C. 154(b) by 926 days.

(21) Appl. No.: 13/581,647

(22) PCT Filed: Mar. 1, 2011

(86) PCT No.: PCT/IL2011/000206
§ 371 (c)(1),
(2), (4) Date: Oct. 12, 2012

(87) PCT Pub. No.: WO2011/107987
PCT Pub. Date: Sep. 9, 2011

(65) Prior Publication Data
US 2012/0320219 A1    Dec. 20, 2012

Related U.S. Application Data

(60) Provisional application No. 61/309,654, filed on Mar. 2, 2010.

(51) Int. Cl.
*H04N 5/225* (2006.01)
*G06K 9/00* (2006.01)
(Continued)

(52) U.S. Cl.
CPC .............. *G01S 7/483* (2013.01); *G01S 17/107* (2013.01); *G01S 17/89* (2013.01)

(58) Field of Classification Search
CPC ....... G01S 7/483; G01S 17/89; G01S 17/107
USPC ........................... 348/169, E05.024; 382/103
See application file for complete search history.

(56) References Cited

U.S. PATENT DOCUMENTS 5,034,810 A * 7/1991 Keeler ............................. 348/31
5,164,823 A * 11/1992 Keeler ............................. 348/31
(Continued)

FOREIGN PATENT DOCUMENTS

WO    2005/076037    8/2005

OTHER PUBLICATIONS

International Search Report and Written Opinion issued in connection with PCT/IL2011/000206, dated Jul. 5, 2011. 16 pages.

*Primary Examiner* — Tung Vo
*Assistant Examiner* — Zaihan Jiang
(74) *Attorney, Agent, or Firm* — Vedder Price PC

(57) ABSTRACT

System for detecting objects protruding from the surface of a body of water in a marine environment under low illumination conditions, the system comprising a gated light source, generating light pulses toward the body of water illuminating substantially an entire field of view, a gated camera, sensitive at least to wavelengths of the light generated by the gated light source, the gated camera receiving light reflected from at least one object, within the field of view, protruding from the surface of the body of water and acquiring a gated image of the reflected light, and a processor coupled with the gated light source and with the gated camera, the processor gating the gated camera to be set 'OFF' for at least the duration of time it takes the gated light source to produce a light pulse in its substantial entirety in addition to the time it takes the end of the light pulse to complete traversing a determined distance from the system and back to the gated camera, the processor further setting, for each pulse, the gated camera to be 'ON' for an 'ON' time duration until the light pulse, reflecting back from the object, is received by the gated camera.

32 Claims, 10 Drawing Sheets

(51) Int. Cl.
*G01S 7/483* (2006.01)
*G01S 17/10* (2006.01)
*G01S 17/89* (2006.01)

(56) References Cited

U.S. PATENT DOCUMENTS

| | | | |
|---|---|---|---|
| 5,192,978 A * | 3/1993 | Keeler | G01S 7/493 348/81 |
| 5,276,632 A * | 1/1994 | Corwin | G01S 7/4802 703/2 |
| 5,467,122 A * | 11/1995 | Bowker | H04N 7/183 348/144 |
| H1783 H * | 2/1999 | McLean | G01S 17/89 348/31 |
| 6,208,248 B1 * | 3/2001 | Ross | 340/552 |
| 6,693,561 B2 | 2/2004 | Kaplan | |
| 7,379,164 B2 | 5/2008 | Inbar et al. | |
| 7,796,809 B1 * | 9/2010 | Carder | G06K 9/00208 348/148 |
| 2005/0036404 A1 * | 2/2005 | Zhu et al. | 367/88 |
| 2007/0058038 A1 * | 3/2007 | David et al. | 348/135 |

* cited by examiner

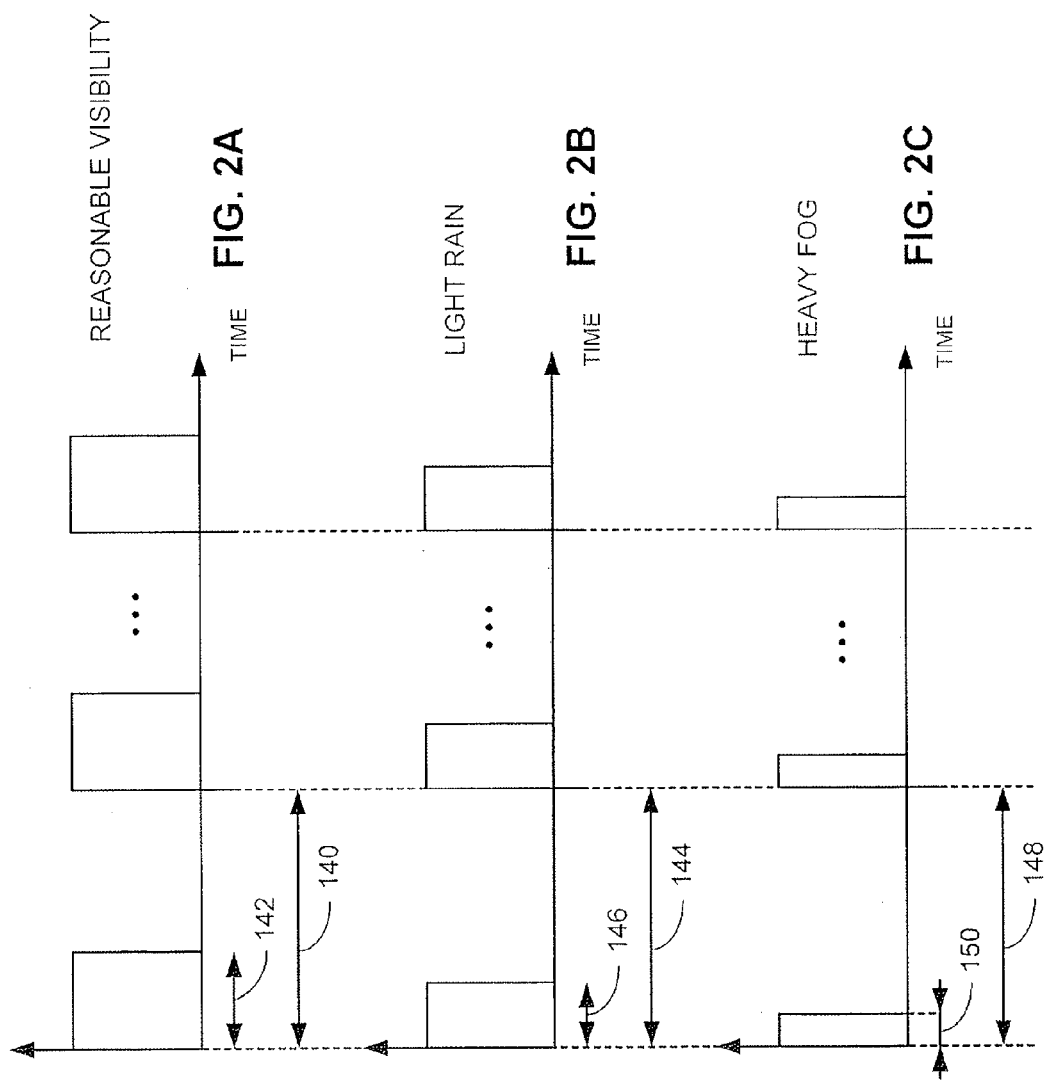

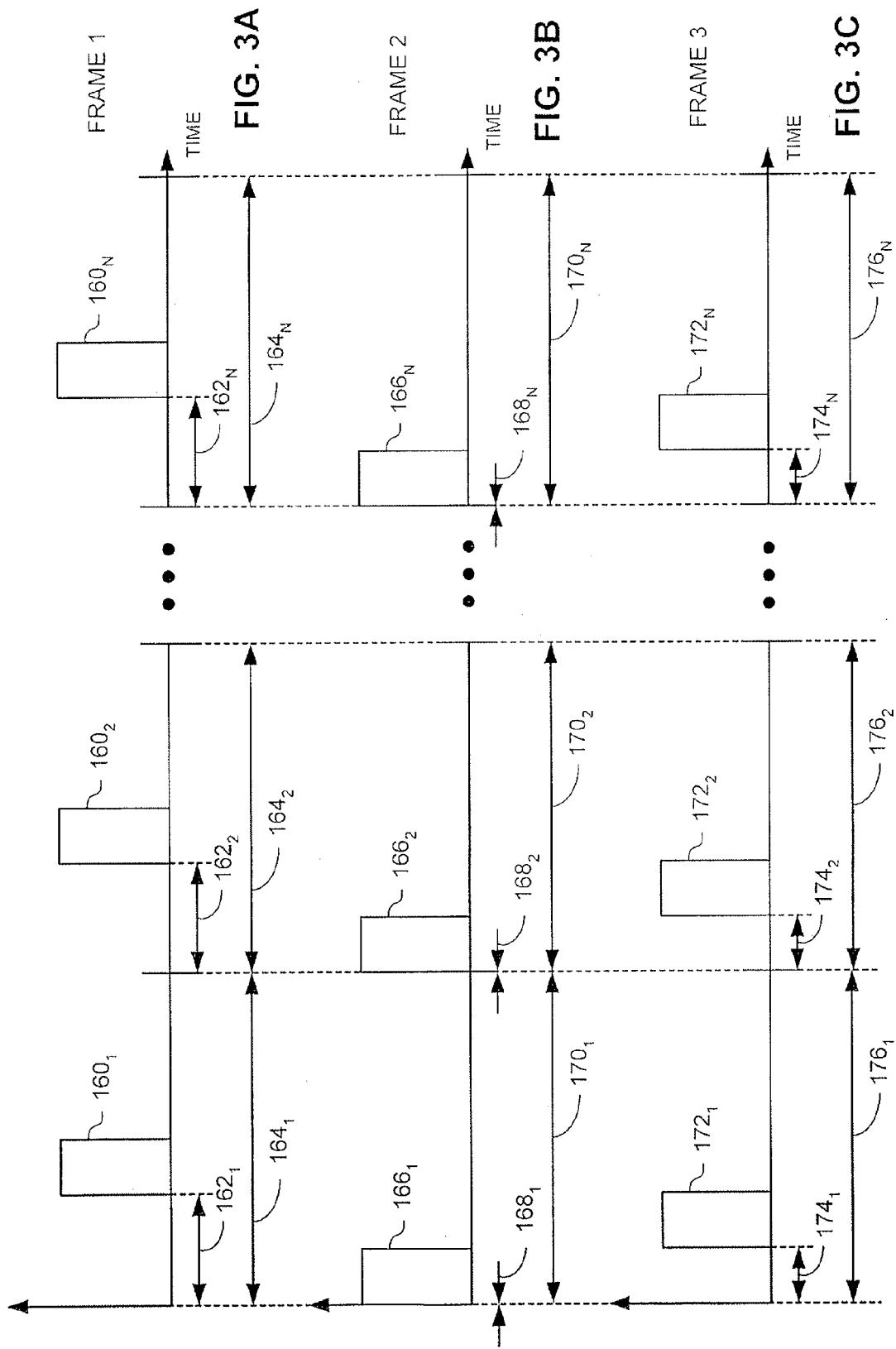

IMAGE GATED CAMERA FOR DETECTING OBJECTS IN A MARINE ENVIRONMENT

FIELD OF THE DISCLOSED TECHNIQUE

The disclosed technique relates to image gating, in general, and to methods and systems for using image gated cameras to detect objects in a marine environment, in particular.

BACKGROUND OF THE DISCLOSED TECHNIQUE

Marine environments, which include lakes, seas, oceans, streams, rivers and other bodies of water, present particular challenges to vessels traveling in such environments under the various illumination conditions and various visibility conditions. For example, various types of semi-submerged, or floating, obstacles and objects in marine environments, such as icebergs, whales, semi-submerged metal ship containers which have fallen overboard, large underwater rocks slightly protruding from the surface of the water, wood logs and the like, pose potential threats to ship hulls and ship propellers. This potential threat is increased under low illumination and bad visibility conditions, such as at night, during a storm or in heavy rain. In addition, the detection of objects in a marine environment, such as buoys or sea marks, as well as the detection of persons who have fallen overboard (i.e., 'man overboard'), present a challenge for individuals on vessels attempting to locate such objects and persons due to the small surface area of these objects and persons appearing above the surface of the water. As above, the task of locating small objects and persons in a marine environment is made more difficult in low illumination and bad visibility conditions. Furthermore, small objects and persons are usually undetected by radar or thermal imagers (e.g., Near Infrared, Medium Infrared or Far infrared imagers). It is noted that the term 'body of water' herein refers to a body of water of sufficient size to support marine traffic. The term 'object' herein refers to semi-submerged, or floating, obstacles, objects or persons in a marine environment. Objects can include icebergs, whales, semi-submerged metal ship containers, large underwater rocks slightly protruding from the surface of the water at low tide, wood logs, buoys, persons and the like.

U.S. Pat. No. 6,693,561 to Kaplan, entitled "System for and method of wide searching for targets in a marine environment" is directed towards a system and a method of searching for targets, both animate and inanimate in a marine environment and comprises a transmitter means, a processor including a receiver means, and an indicator. The transmitter means is mounted on an object, which is above water, such as on-board a marine vessel, an aircraft, or on a seaside structure. The transmitter means emits first and second beams of optical radiation at first and second zones of water. The first beam has a first wavelength characteristic having wavelengths in the ultraviolet to blue range (300-475 nanometers), and capable of entering the first zone of water and being refracted there through as a refracted beam. The second beam has a second wavelength characteristic having wavelengths in the infrared range (650-1500 nanometers) and capable of reflecting from the second zone of water as a reflected beam. The processor is operative for identifying locations of the targets in the marine environment. The receiver means is operative for separately detecting return target reflections reflected off any targets impinged by the refracted and/or the reflected beams to find an identified target.

The indicator is operative for indicating the identified target. If the only target reflection detected is from the refracted beam, then an underwater target is identified. If the only target reflection detected is from the reflected beam, then an above water target is identified. If target reflections from both the refracted beam and the reflected beam are detected, then multiple targets are identified, or a single target extending both above and below the water is identified. The ultraviolet and infrared beams are pulsed, and the time width of each pulse and the spacing between pulses are known. By determining the time duration from the moment a transmitted pulse is emitted until a corresponding received pulse is detected, the distance or range to a target can be computed, as well as the depth to an underwater target. In addition, a deviation prism is located in front of the transceiver and is rotated to expand the target search area. An outgoing light beam and/or incoming target reflections pass un-obstructively through a central aperture of the prism so as to enable a forward search area along an axis to be continuously scanned. The beam and/or reflections are deviated by outer wedge-shaped portions of the prism to direct deviated light to one side or the other of the axis.

U.S. Pat. No. 7,379,164 to Inbar et al., entitled "Laser gated camera imaging system and method" is directed towards a gated camera imaging system and method, utilizing a laser device for generating a beam of long duration laser pulses toward a target. A camera receives the energy of light reflexes of the pulses reflected from the target. The camera gating is synchronized to be set 'OFF' for at least the duration of time it takes the laser device to produce a laser pulse in its substantial entirety, including an end of the laser pulse, in addition to the time it takes the laser pulse to complete traversing a zone proximate to the system and back to the camera. The camera gating is then set 'ON' for an 'ON' time duration thereafter, until the laser pulse reflects back from the target and is received in the camera.

The laser pulse width substantially corresponds to at least the 'ON' time duration. Preferably, the laser device includes a Diode Laser Array (DLA).

The system further includes an optical fiber for transferring the laser beam from the laser device to an optical fiber exit of the optical fiber, as well as gimbals, comprising a gyro feedback, for stabilizing the camera and the optical fiber exit of the optical fiber in a packaged module. The system also includes an image-process stabilizer and a support unit for supporting and providing height and rotational adjustments to the camera and the optical fiber exit of the optical fiber. The system also includes at least one filter for spectral and spatial filtering as well as an optical multiplier for enlarging the image of the target. The optical axis of the laser device can also be substantially parallel to the optical axis of the camera. The DLA can be implemented in the near IR range or the blue-green range of the visible light spectrum. The camera can include a Charge Coupled Device (CCD), a Gated Intensified Charge Injection Device (GICID), a Gated Intensified CCD (GICCD), a Gated Image Intensifier, or a Gated Intensified Active Pixel Sensor (GI-APS).

SUMMARY OF THE PRESENT DISCLOSED TECHNIQUE

It is an object of the disclosed technique to provide a novel method and system for detecting objects protruding from the surface of a body of water in a marine environment In accordance with the disclosed technique, there is thus provided a system for detecting objects protruding from the surface of a body of water in a marine environment under low illumination conditions. The system includes a gated light source, a gated camera and a processor. The processor is coupled with the gated light source and with the gated camera. The gated light source generates light pulses toward the body of water, which illuminates substantially an entire field of view. The gated camera is sensitive at least to the wavelengths of the light generated by the gated light source. The gated camera receives light reflected from at least one object, within the field of view, protruding from the surface of the body of water and acquires a gated image of the reflected light. The processor gates the gated camera to be set 'OFF' for at least the duration of time it takes the gated light source to produce a light pulse in its substantial entirety in addition to the time it takes the end of the light pulse to complete traversing a determined distance from the system and back to the gated camera. The processor further sets, for each pulse, the gated camera to be 'ON' for an 'ON' time duration until the light pulse, which reflects back from the object, is received by the gated camera.

In accordance with another aspect of the disclosed technique, there is thus provided a system for detecting objects protruding from the surface of a body of water in a marine environment under high illumination conditions. The system includes a multi-spectral camera, a background multi-spectral characteristics database and a processor. The processor is coupled with the multi-spectral camera and with the background multi-spectral characteristics database. The multi-spectral camera, acquires a multi-spectral images of the body of water. The background multi-spectral characteristics database, stores spectral characteristics of the body of water. The processor determines the spectral characteristics of each pixel in the multi-spectral image and compares the determined spectral characteristics to the spectral characteristics stored in the background multi-spectral characteristics database. The processor identifies a pixel in the image, as corresponding to at least a part of at least one object protruding from the body of water, when the processor identifies that the spectral characteristics of the pixel are different from the spectral characteristics of the background. The processor further determines a representation of at least a part of the object according to the identified pixels.

In accordance with a further aspect of the disclosed technique, there is thus provided a system for detecting objects protruding from the surface of a body of water in a marine environment. The system includes a low illumination conditions module, a high illumination conditions module and a processor. The low illumination conditions module includes a gated light source and a gated camera. The high illumination conditions module includes a multi-spectral camera and a background multi-spectral characteristics database. The processor is coupled with the gated light source, the gated camera, the multi-spectral camera and with the background multi-spectral characteristics database. The gated light source generates light pulses toward the body of water, which illuminates substantially an entire field of view. The gated camera is sensitive at least to the wavelengths of the light generated by the gated light source. The gated camera receives light reflected from at least one object, within the field of view, protruding from the surface of the body of water and acquires a gated image of the reflected light. The multi-spectral camera, acquires a multi-spectral images of the body of water. The background multi-spectral characteristics database, stores spectral characteristics of the body of water. During low illumination conditions, the processor gates the gated camera to be set 'OFF' for at least the duration of time it takes the gated light source to produce a light pulse in its substantial entirety in addition to the time it takes the end of the light pulse to complete traversing a determined distance from the system and back to the gated camera. The processor further sets, for each pulse, the gated camera to be 'ON' for an 'ON' time duration until the light pulse, which reflects back from the object, is received by the gated camera. During high illumination conditions, the processor determines the spectral characteristics of each pixel in the multi-spectral image and compares the determined spectral characteristics to the spectral characteristics stored in the background multi-spectral characteristics database. The processor identifies a pixel in the image, as corresponding to at least a part of at least one object protruding from the body of water, when the processor identifies that the spectral characteristics of the pixel are different from the spectral characteristics of the background. The processor further determines a representation of at least a part of the object according to the identified pixels.

In accordance with a further aspect of the disclosed technique there is thus provide a method for detecting objects protruding from the surface of a body of water in a marine environment during at least one of low and intermediate illumination conditions. The method includes the procedures of detecting visibility conditions, determining the pulse width light pulses according to the visibility conditions and transmitting a plurality of light pulses toward the body of water, the light pulses exhibiting the determined pulse width. The method further includes the procedures of acquiring a gated image of the transmitted light pulses, alleviating interference in the gated image and detecting objects in the body of water according to the gated image. The method also includes the procedures of acquiring a situation awareness image and superimposing representations of the detected objects on the situation awareness image.

In accordance with another aspect of the disclosed technique, there is thus provided a method for detecting objects protruding from the surface of a body of water in a marine environment, during at least one of high and intermediate illumination conditions. The method includes the procedures of determining the multi-spectral characteristics of the body of water, acquiring a multi-spectral image of the body of water and identifying pixels, which do not conform with background multi-spectral characteristics. The method further includes the procedures of detecting objects in the body of water according to the identified pixels in the multi-spectral image, which do not conform with background multi-spectral characteristics, acquiring a situation awareness image and superimposing representations of the detected objects on the situation awareness image.

In accordance with a further aspect of the disclosed technique there is thus provides a method for detecting objects protruding from the surface of a body of water in a marine environment, the method includes the procedures of detecting illumination and visibility conditions. During high or intermediate illumination conditions, the method includes the procedures of determining the multi-spectral characteristics of the body of water, acquiring a multi-spectral image of the body of water and identifying pixels, which do not conform with background multi-spectral characteristics. During high or intermediate illumination conditions, the method further includes the procedure of detecting objects in the body of water according to the identified pixels in the multi-spectral image, which do not conform with background multi-spectral characteristics. During low or intermediate illumination conditions, the method includes the procedures of detecting visibility conditions, determining the pulse width light pulses according to the visibility conditions and transmitting a plurality of light pulses toward the body of water, the light pulses exhibiting the determined pulse width. During low or intermediate illumination conditions, the method further includes the procedures of acquiring a gated image of the transmitted light pulses, alleviating interference in the gated image and detecting objects in the body of water according to the gated image. The method also includes the procedures of acquiring a situation awareness image and superimposing representations of the detected objects on the situation awareness image.

BRIEF DESCRIPTION OF THE DRAWINGS

The disclosed technique will be understood and appreciated more fully from the following detailed description taken in conjunction with the drawings in which:

FIGS. 2A, 2B and 2C are schematic illustrations of timing diagrams of the pulses transmitted by a gated light source in various visibility conditions, in accordance with another embodiment of the disclosed technique;

FIGS. 3A, 3B and 3C are schematic illustrations of timing diagrams of the pulses transmitted by a gated light source in three different frames, in accordance with a further embodiment of the disclosed technique;

DETAILED DESCRIPTION OF THE EMBODIMENTS

Figure 1A:
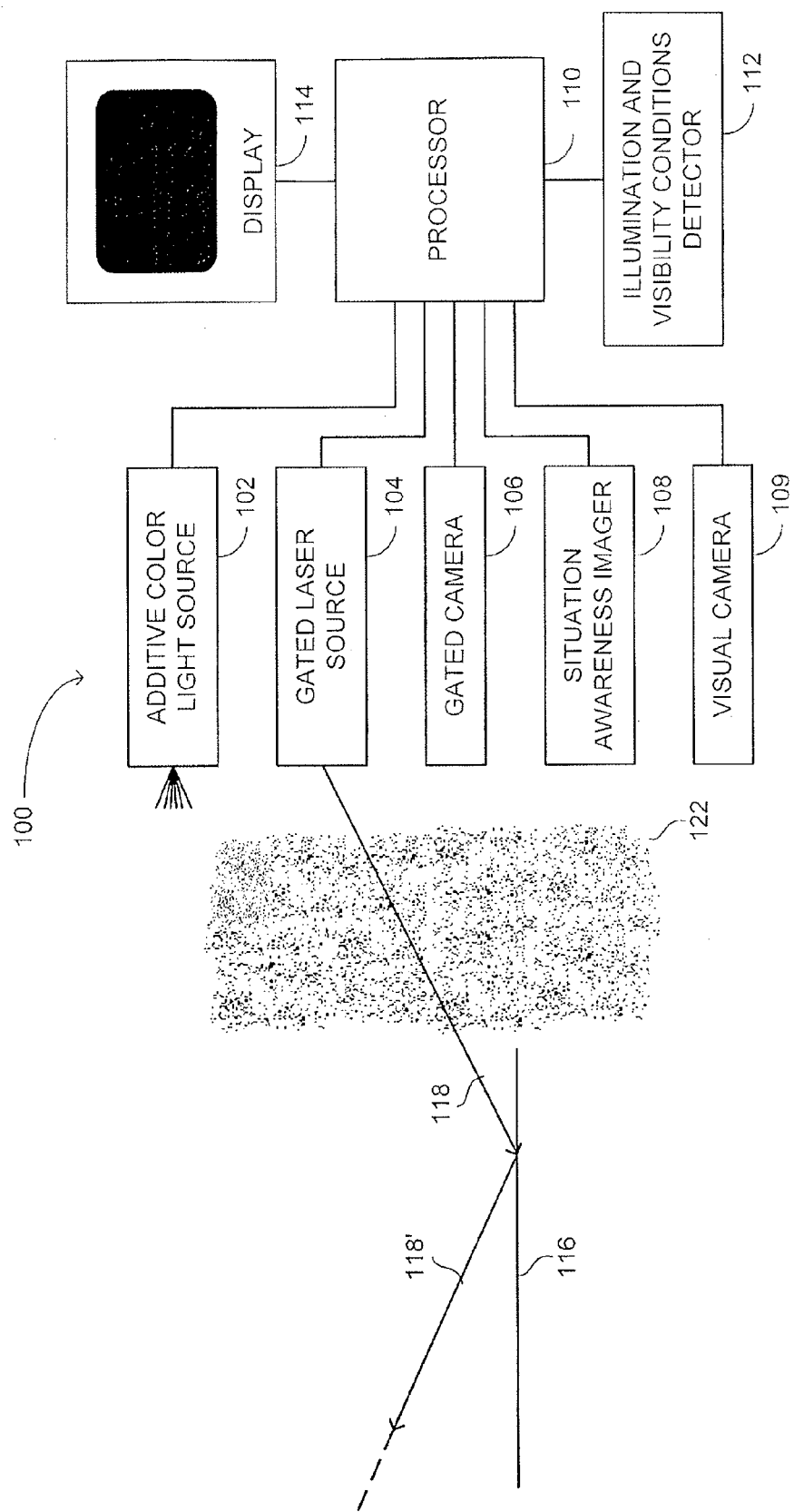
FIGS. 1A and 1B are a schematic illustrations of a system for detecting semi-submerged and floating objects in a marine environment under low or intermediate illumination conditions, constructed and operative in accordance with an embodiment of the disclosed technique.

The disclosed technique overcomes the disadvantages of the prior art by providing a system for detecting semi-submerged and floating objects in a marine environment during good and or bad visibility conditions as well as in low, intermediate and high illumination conditions. The system includes a light gated camera for detecting these objects under low illumination (e.g., nighttime) conditions and a multi-spectral camera for detecting these object under high illumination conditions (e.g., daytime). The term 'visibility' may be defined according to the longest distance a human eye can detect an object against a bright background. Alternatively, the term 'visibility' may be defined according to the distance at which the contrast between an object and the background drops below two percent relative to the initial contrast value (which is usually 1) between that object and the background (e.g., the reference contrast is the contrast between the object and the background when the distance between the object and the camera is substantially small). The term 'illumination' may be defined according to the illuminance measurement (e.g., made by a LUX meter), in the vicinity of the system. The term 'body of water' herein refers to a body of water of sufficient size to support marine traffic. The term 'object' herein refers objects or obstacles protruding from the surface of the body of water (e.g., semi-submerged, or floating obstacles or objects), such as icebergs, whales, whales spout, semi-submerged metal ship containers, large underwater rocks slightly protruding from the surface of the water during low tide, wood logs, buoys or persons and the like. Objects or obstacles protruding from the surface of the body of water may also be referred to herein as 'objects of interest' or 'targets'.

In general, water exhibits substantially specular reflection to light impinging thereupon. Therefore, an image of a substantially un-illuminated body of water, acquired by a camera appears dark. When a beam of light impinges on the surface of a body of water, a portion of the light reflects off the surface in a direction away from the light source (i.e., the surface of the body of water is a specular reflector and the angle of impingement equals the angle of reflection) and a portion is absorbed by the water. However, when light impinges on an object protruding from the surface of the water body, at least a portion of the impinging light diffusively reflects off the object. Therefore, part of the light impinging on the object reflects back toward light source and an image of the body of water, acquired by a camera, exhibits a representation of the object.

The system according to the disclosed technique includes a gated camera and a gated light source for detecting objects in a body of water under low illumination conditions. The gated light source (e.g., a laser source, a Light Emitting Diode—LED) generates a beam of light pulses, toward a body of water. Each light pulse illuminates substantially the entire Field Of View (FOV) of the gated camera (i.e., the angular extent of the scene imaged by the gated camera). The gated camera is gated (i.e., synchronized) such that it is set to an 'OFF' state for at least the duration of time it takes the light source to produce a light pulse in its substantial entirety (i.e., for the entire light pulse to exit the light source), in addition to the time it takes the light pulse to complete traversing a determined distance from the system (i.e., the distance at which it is desired to detect objects in the body of water) and back to the gated camera (i.e., the 'OFF' time duration). Thereafter, for each pulse, the gated camera is set to an 'ON' state for an 'ON' time duration in which the light, reflected back from the target, is received by the gated camera. During the 'ON' period, the gated camera receives the energy of the light reflected from an object in the body of water and acquires an image of this reflected light (i.e., when the object is in the FOV of the gate camera). The image acquired by the gated camera is referred to herein as a gated image. The term 'gating period' refers herein to the time-period between the start of the transmission of one light pulse to the start of the transmission of the next light pulse. The term 'gating cycle' herein refers to the transmission of the light pulse, the 'OFF' state of the gated camera and the 'ON' sate of the gated camera during the gating cycle. The gated camera detects objects between a distance $D_1$ and a distance $D_2$ away from the gated camera where $D_2 > D_1$. The difference between $D_2$ and $D_1$ is defined herein as the 'depth of field'. $D_1$ is determined according to the 'OFF' time period of the camera. The depth of field is determined according to the convolution between a function representing light pulse shape and a function representing the 'ON' period of the gated camera.

The width of the generated light pulses and of the 'ON' time of the gated camera is determined according to the visibility conditions between the system and the object. When the visibility conditions deteriorate and the vicinity of the system is substantially obscured by aerosol (e.g., fog, haze, rain, dust, smoke and the like), both the duty cycle of the light pulse (i.e., the ratio between the light pulse width and the gating period) and the 'ON' time period of the camera are shortened to a minimum level. When the vicinity of the system is partially obscured, the duty cycle of the light pulse, and thus the 'ON' time of the camera, is set to an intermediate level. When the vicinity of the system is clear, the duty cycle of the light pulse, and thus the 'ON' time of the camera, is set to a maximum time-period. Furthermore, the system may include a situation awareness imager for acquiring a situation awareness image of the surroundings of the system. Thus, the image acquired by the gated camera, or representations of objects therein, may be superimposed on the situation awareness image.

The system according to the disclosed technique further includes a multi-spectral camera and a background multi-spectral characteristics database for detecting objects protruding from the surface of body of water under high illumination conditions. The background multi-spectral characteristics database stores the multi-spectral characteristics of a body of water under high illumination and good visibility conditions. According to one alternative, the multi-spectral characteristics database includes a set of typical signatures (i.e., spectral compositions) of the body of water under high illumination and good visibility conditions. According to another alternative, the multi-spectral characteristics database includes basis vectors, which span the spectrum of the body of water (e.g., determined according to Principal Component Analysis of a reference image acquired by the multi-spectral camera). The multi-spectral camera acquires a multi-spectral image of the body of water. The spectral signature of each pixel in the multi-spectral image is determined and compared to the spectral signatures in the background multi-spectral characteristics database. When the spectral signature of a pixel does not match one of the spectral signatures stored in the background multi-spectral signature database, then that pixel is indicated as potentially being a part of an object. Furthermore, the system may include a situation awareness imager for acquiring a situation awareness image of the surroundings of the system. Thus, the multi-spectral image, acquired by the multi-spectral camera, may be superimposed on the situation awareness image. During intermediate illumination conditions (e.g., twilight, dawn or overcast conditions), the system according to the disclosed technique may employ both the gated camera and the multi-spectral camera.

Figure 1B:
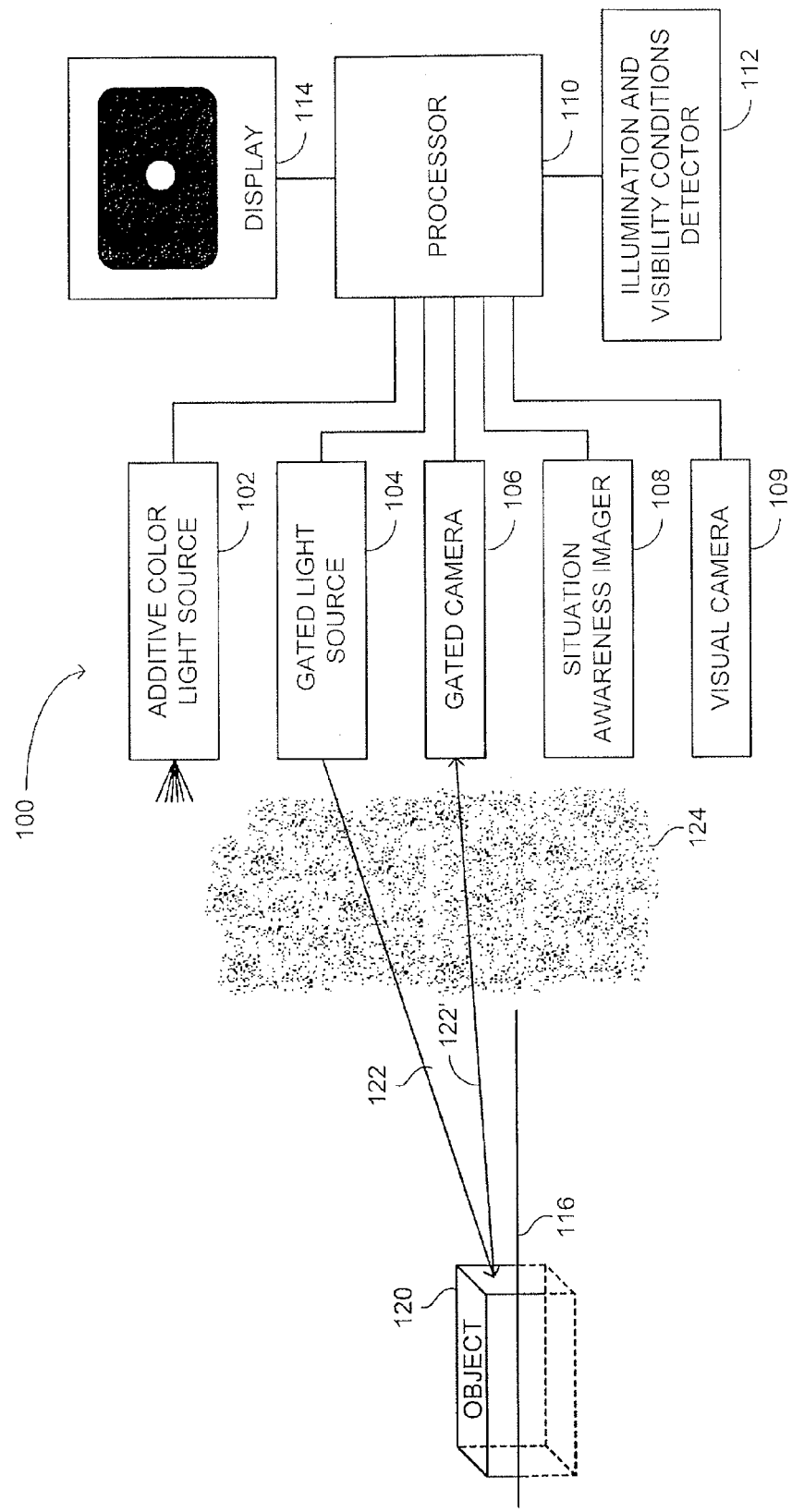

Reference is now made to FIGS. 1A and 1B, which are schematic illustrations of a system, generally referenced 100, for detecting objects protruding from the surface of a body of water (e.g., semi-submerged, or floating obstacles or objects), in a marine environment under low or intermediate illumination conditions, constructed and operative in accordance with an embodiment of the disclosed technique. System 100 includes an additive color light source 102, a gated light source 104, a gated camera 106, a situation awareness imager 108 and a visual camera 109 sensitive in the visible spectral band. System 100 further includes a processor 110, an illumination and visibility conditions detector 112 and a display 114. Additive color light source 102, gated light source 104, gated camera 106, situation awareness imager 108, visual camera 109, illumination and visibility conditions detector 112 and display 114 are all coupled with processor 110. Gated light source 104, (e.g., a laser source, an LED) generates a beam of light pulses that illuminate substantially the entire FOV. Furthermore, gated light source 104, generates a beam of light pulses at a specified amplitude and wavelength which conforms with eye safety regulations such as the European Norm—EN and the American National Standard Institute—ANSI (e.g., the wavelength of the light is between 800 and 830 nanometers). Gated camera 106 includes, for example, a CCD, GICID, GICCD, GIAPS, GCMOS, EBCMOS, APD or a PV device, sensitive in the wavelengths of the light generated by gated light source 104. Furthermore, gated camera 106 is located in close proximity to gated light source 104. Situation awareness imager 108 is, for example, an infrared imager (e.g., a forward Looking Infrared (FLIR) imager operating in either the 3 to 5 micrometer band using an InGaAs sensor or in the 8-12 micrometer band). Situation awareness imager 108 may further be an ultraviolet camera. Situation awareness imager 108 may also be a RADAR and the situation awareness image is, thus, an image produced by this RADAR.

Under low illumination conditions, gated light source 104 generates a beam 118 of light pulses toward the body of water. When no object is present in the body of water (FIG. 1A), a portion of beam 118 of the light pulses reflects off the surface 116 of the body of water, away from system 100, as a reflected beam 118' of light pulses and a portion is absorbed by the body of water. Thus, the gated image acquired by gated camera 106 is a dark image.

When an object, such as object 120 (FIG. 1B) is present in the body of water and protrudes from the surface thereof, then a beam 122 of light pulses reflects off object 120, back toward system 100. Processor 110 gates (i.e., synchronizes) gated camera 106 to be set 'OFF' for at least the time duration it takes the gated light source 104 to produce a light pulse, in addition to the time it takes the end of the light pulse to complete traversing a determined distance from system 100 (i.e., the distance $D_1$ at which it is desired to start detecting objects in the body of water), and back to the gated camera 106 (i.e., the 'OFF' time duration which is equal to twice $D_1$ divided by the speed of light). Thereafter, for each pulse, processor 110 gates camera 106 to be set 'ON' for an 'ON' time duration in which the light pulse, reflected back from object 120, is received by gated camera 106. Thus, gated camera 106 receives the light reflected from object 120.

It is noted that the pulse width and the 'ON' time duration of gated camera 106 are not necessarily the same. It is further noted that, in general, a frame period (i.e., time-period of acquiring a single gate image) includes a plurality of gating cycles. Therefore, by setting different light pulse width and different 'ON' times of gated camera 106, a single gated image may include objects from a plurality of depth of fields. For example, in half the gating cycles in a single frame, the light pulse width and different 'ON' times are set to result in one depth of field and in the other half of the gating cycles the light pulse width and different 'ON' times are set to result in another depth of field.

Illumination and Visibility conditions determinator 112 determines the visibility conditions between the system and the object. Processor 110 determines both the width of the light pulse and the time duration of the gating of camera 106, according to the visibility conditions between the system and the object. The relationship between the pulse width and the visibility conditions is further explained below in conjunction with FIGS. 2A-2C. According to one alternative, illumination and visibility conditions detector 112 detects the visibility conditions by analyzing the image acquired by gated camera 106 around a region of interest in the image, and determining a value corresponding to the contrast between objects and background in the image. As the visibility in the vicinity of system 100 decreases, this contrast value also decreases. When Illumination and Visibility conditions detector 112 detects the visibility conditions according to an image acquired gated camera 106, Illumination and Visibility conditions determinator 112 may be embedded in processor 110. According to anther alternatively, Illumination and Visibility conditions determinator 112 may determine the visibility conditions according to input from a user.

The gated image, acquired by gated camera 106, includes a representation of object 120. Processor 110 receives the gated image from gated camera 106 and displays this image on display 114. Furthermore, processor 110 may further produce an audio or tactile warning to the user when an object is detected in the image acquired by gated camera 106.

Situation awareness Imager 108 acquires an image of the surroundings of system 100 (i.e., a situation awareness image). Processor 110 registers the gated image, acquired by gated camera 106, and the situation awareness image. In other words, processor 110 determines the offset the rotation the scaling and grey scale correction the situation awareness image relative to the gated image. For example, the offset correction may be determined according to the mechanical position relationship between the gated camera and the situation awareness imager. Since the gated image includes substantially no representations of the surroundings of object 120 (i.e., the surroundings of object 120 in the gated image appear dark), processor 110 superimposes the representation of object 120 present in the gated image on the situation awareness image acquired by situation awareness imager 108. Thus, the user can view a representation corresponding to object 120 relative to the surroundings. Processor 110 may superimpose on the situation awareness image only the section in the gated image corresponding to objects in the body of water (i.e., the superposition of the image acquired by the gated camera on the image of the surroundings may be a weighted superposition). Furthermore, processor 110 identifies the horizon line according to the situation awareness image. Since the skies (not shown in FIGS. 1A and 1B) and the body of water exhibit substantially different characteristics (e.g., different wavelengths in the visible or thermal bands), the horizon line is well distinct in the situation awareness image. Processor 110 determines which part in the situation awareness image corresponds to the skies and which part corresponds to body of water 116. Thus, processor 110 may determined that the light was reflected from an object above the horizon line and thus that object is not a semi-submerged object.

System 100 has two modes of operation, observation mode and detection mode. During operation in the observation mode, system 100 attempts to identify probable objects at a large depth of field (e.g., on the order of several kilometers). Thus, processor 110 determines either the light pulse width, the 'ON' time duration of the gated camera or both (i.e., not necessarily by the same proportions) to the result in the required large depth of field. During operation in the detection mode, system 100 detects objects at a small depth of field (e.g., on the order of hundreds of meters). Thus, processor 110 determines either the light pulse width, the 'ON' time duration of the gated camera or both to result in the required small depth of field.

When waves exist in the body of water, system 100 may miss detect these waves as corresponding to objects protruding from the surface of the body of water (i.e., since these waves reflect the light generated by gated light source 104 back toward gated camera 106). Therefore, processor 110 tracks the motion the representations of the received reflections in a plurality of images acquired by gated camera 106 (i.e., a plurality of gated images). When processor 110 identifies that a plurality of these representations exhibit substantially the same motion pattern between the acquired gated images (i.e., by gated camera 106), processor 110 determines these representations as corresponding to reflections from waves. Alternatively, processor 110 determines the motion pattern of the waves (e.g., an average motion vector of segments in the situation awareness image, identified as corresponding to waves, determined from a plurality of situation awareness image acquired when no objects are present in the body of water). When processor 110 identifies an object in the body of water (i.e., according to a gated image), processor 110 tracks the motion of the identified object (i.e., according to a plurality of gated images). If the motion of the tracked object substantially differs from the motion pattern of the waves, then, processor 110 identifies that tracked object as an object in the body of water. Conversely, if the motion of the tracked object is substantially similar to the motion pattern of the waves, then, processor 110 identifies that tracked object as corresponding to a wave.

When system 100 operates in an environment which includes a light source or sources located outside the body of water (e.g., light posts near the shore). A source of light, originating from a source other than gated light sources 104 is referred to herein as an external light source. The light originating from these external light sources may either propagate directly toward system 100 or reflect from body of water 116 toward system 100. These reflections may be received by gated camera 106 (i.e., when the light originating from the light sources includes similar wavelengths to the wavelengths of light source 106). Processor 110 may miss detect these reflections as corresponding to objects protruding from the surface of the water. Therefore, visual camera 109 acquires a visual image of the body of water. Processor 110 registers this visual image with the image acquired by gated camera 106. Processor 110 identifies segments in the gated image, acquired by gated camera 106, which have corresponding segments in the visual image acquired by the visual camera 109. Processor 110 determines these segments as corresponding to reflections of light originating from the external light sources in the surroundings of system 100. Alternatively, processor 110 identifies a segment in the visual image as corresponding to reflections of light originating from the external light sources by identifying two segments in the visual image. The first segment being a segments which generally defines a line perpendicular to the horizon line (i.e., which, as mentioned above, is also determined according to the situation awareness image) and the second segment which is located on that line. This second segment is identified as the external light source. According to yet another alternative, the gated imager acquires an image (i.e., gated camera 106 is set to the 'ON' state) when no light pulse is transmitted. Representations of objects, appearing in this acquired image are determined to be light originating from external light sources. To reduce the probability of miss detection, processor 110 may combine the above two methods (e.g., according to an AND operation).

System 100 may further includes a millimeter wave camera (not shown in FIGS. 1A and 1B). Representation of objects protruding from the surface of body of water 116 will appear in an image, referred to as a millimeter wave image, acquired by the millimeter wave camera. Processor 110 identifies these representations and thereby the probability that processor 110 will not identify objects in the body of water is reduced.

A situation may occur (e.g., due to regulation) where it is desired to conceal the light emitted by gated light source 104. For example, when the wavelength of the light is substantially in the red spectral band and the system is located on a vessel. According to international marine regulations red light designates the port side of a vessel. Thus, the light emitted from the starboard side of the vessel may deceive an observer observing the vessel (i.e., the observer may mistake the starboard side of the vessel as being the port side of the vessel). Therefore, additive color light source 102 emits light, at a wavelength different than the wavelength of the light emitted by gated light source 104 and at a relative intensity (i.e., relative to the sensitivity of the human eye), that will render that light invisible to the observer.

The visibility conditions may deteriorate due aerosol (e.g., fog, haze, dust, smoke and the like) in the vicinity of system 100. Thus, objects in a body of water may be substantially obscured to gated camera 106 and infrared imager 108. For example, in FIG. 1B, object 120 is obscured by aerosol 124. As mentioned above, when the visibility conditions between the system and the object deteriorates, both the pulse width, and the 'ON' time of gated camera 106 are shortened. Thus, the reflections of the light pulses from the aerosol are reduced (i.e., the backscatter is reduced). Conversely, when the visibility conditions between the system and the object improve, both the light pulse width and the 'ON' time of gated camera 106 are lengthened. Reference is now made to FIGS. 2A, 2B and 2C, which are schematic illustrations of timing diagrams of the light pulses transmitted by gated light source 104 in various visibility conditions, in accordance with another embodiment of the disclosed technique. FIGS. 2A-2C will be referred to also with reference to FIG. 1B. FIG. 2A is the timing diagram of the light pulses generated by gated light source 104 under good visibility conditions (e.g., visibility on a clear day). Time duration 140 represents the gating period (i.e., the period in which the gating cycle occurs) and time duration 142 represents the light pulse width. Time duration 142 is set to maximum. For example, time duration 140 on the order of tens of micro-seconds and time duration 142 is on the order of a few micro-seconds.

FIG. 2B is the timing diagram of the light pulses generated by gated light source 104 under intermediate visibility conditions (e.g. visibility during rain or light haze). Time duration 144 represents the gating period and time duration 146 represents the light pulse width. Time duration 146 is set to an intermediate level. For example, time duration 144 is on the order of tens of micro-seconds and time duration 146 is between several hundreds of nano-seconds and a few micro-seconds.

FIG. 2C is the timing diagram of the pulses generated by gated light source 104 under poor visibility conditions (e.g., visibility during heavy fog). Time duration 148 represents the gating period and time duration 150 represents the pulse width. Time duration 150 is set to a minimum level. For example, time duration 148 is on the order of tens of microseconds and time duration 150 is on the order of hundreds of nanoseconds. It is noted that although only three different visibility conditions are described in FIGS. 2A-2C, any number of light pulse widths corresponding to different visibility conditions may be employed. In general the pulse width of the light pulse and the 'ON' time of gated camera 106 is reduced as the visibility deteriorates. (i.e., not necessarily by the same proportions). In FIGS. 2A, 2B and 2C, gating periods 142, 144 and 148 are depicted as equal. It is, however, noted that when the pulse width is reduced, the gating cycle may also be reduced thereby substantially maintaining the same duty cycle.

When the light source of a first system, such as system 100 (FIGS. 1A and 1B), directs the light toward a second system substantially similar to system 100, the gated camera of the second system may acquire an image of the light of the first system. This light of the first system may cause blooming in the gated camera of the second system. To reduce the probability of one system causing blooming to the other, all the pulses in a light pulses, generated during each frame, are transmitted at the same random time-period within the gating period. In other words, the phase of all the light pulses, transmitted during each frame, within the gating period, is random. Alternatively, the phases of the transmitted pulses within each frame are randomly determined. According to yet another alternative, each system transmits the light pulses thereof with a different polarization state (e.g., randomly determined polarization state) and the gated camera of each system includes a polarization filter admitting only light exhibiting the perpendicular polarization state associated with that system. Thus, in system 100, gated light source 104 generates light at a randomly determined polarization state associated therewith and gated camera 106 includes a polarization filter that admits only light exhibiting that polarization state.

Reference is now made to FIGS. 3A, 3B and 3C, which are schematic illustrations of timing diagrams of the light pulses generated by gated light source 104 (FIGS. 1A and 1B) in three different frames, in accordance with a further embodiment of the disclosed technique. FIGS. 3A, 3B and 3C are referred to also with reference to FIG. 1B. FIG. 3A is the timing diagram of the pulses $160_1$, $160_2$, ..., $160_N$, generated by gated light source 104 during Frame 1. Time periods $164_1$, $164_2$, ..., $164_N$ represent the gating periods of pulses $160_1$, $160_2$, ..., $160_N$ respectively. Time periods $162_1$, $162_2$, ..., $162_N$ represent the phases of pulses $160_1$, $160_2$, ..., $160_N$ within gating periods $164_1$, $164_2$, ..., $164_N$ respectively. Phases $162_1$, $162_2$, ..., $162_N$ are of equal durations.

FIG. 3B is the timing diagram of the pulses $166_1$, $166_2, \ldots, 166_N$ generated by gated light source 104 during Frame 2. Time periods $170_1, 170_2, \ldots, 170_N$ represent the gating periods of pulses $166_1, 166_2, \ldots, 166_N$ respectively. Time periods $168_1, 1682_2, \ldots, 168_N$ represent the phases of pulses $166_1, 166_2, \ldots, 166_N$ within gating periods $170_1, 170_2, \ldots, 170_N$ respectively during Frame 2. Phases $168_1, 168_2, \ldots, 168_N$ are of equal durations different from phases $162_1, 162_2, \ldots, 162_N$.

FIG. 3C is the timing diagram of the pulses $172_1, 172_2, \ldots, 172_N$ generated by gated light source 104 during Frame 3. Time periods $176_1, 176_2, \ldots, 176_N$ represent the gating periods of pulses $172_1, 172_2, \ldots, 172_N$. Time periods $174_1, 174_2, \ldots, 174_N$ represent the phases of pulses $172_1, 172_2, \ldots, 172_N$ within gating periods $176_1, 176_2, \ldots, 176_N$ respectively during Frame 3. Phases $174_1, 174_2, \ldots, 174_N$ are of equal durations different from both phases $162_1, 162_2, \ldots, 162_N$ and phases $168_1, 168_2, \ldots, 168_N$.

Processor 110 randomly determines phases $162_1, 162_2, \ldots, 162_N$, phases $168_1, 168_2, \ldots, 168_N$ and phases $174_1, 174_2, \ldots, 174_N$. Processor 110 determines the phase shift of the light pulses within the respective gating periods such that the gating cycle may be completed before the end of the gating period. Additionally, the duty cycle of gated light source 104 is smaller than 50%. Furthermore, gated camera 106 is set 'ON' for only a fraction of the gating period. Therefore, the probability that gated camera 106 will be set to the 'ON' state when another system transmits the light pulses thereof (i.e., at the randomly determined phases thereof as explained above) is reduced. Alternatively, processor 110 cyclically increases the phase of the transmitted light pulses for each frame. Since the first system is not synchronized with the second system, the probability that the phase of the transmitted pulses is similar in the two systems is reduced.

Figure 4:
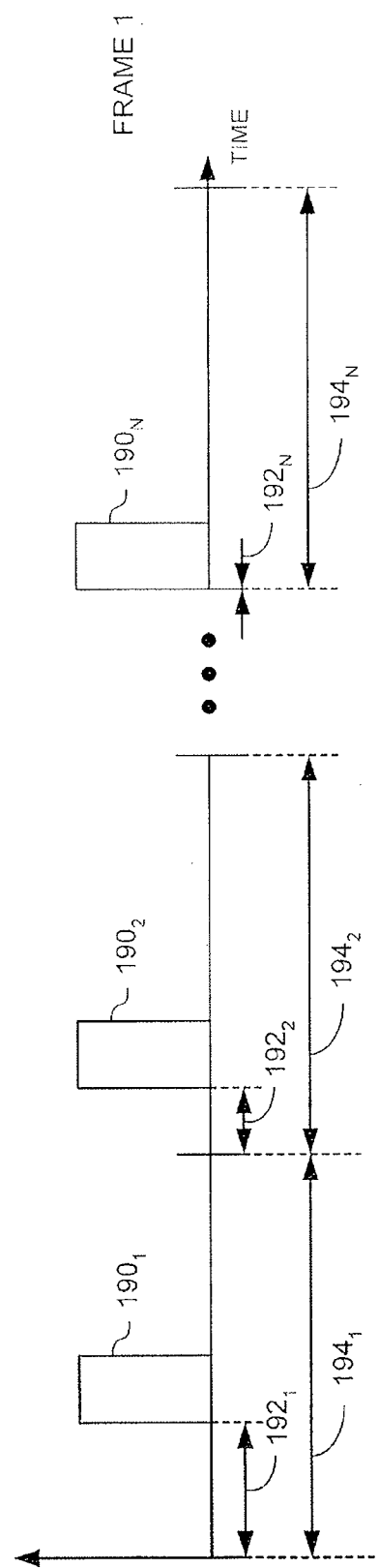
FIG. 4 is a schematic illustrations of timing diagrams of the pulses transmitted by a gated light source in a single frame, in accordance with another embodiment of the disclosed technique.

As mentioned above, according to another embodiment of the disclosed technique, the phases of the transmitted pulses, within each frame is randomly determined. Reference is now made to FIG. 4, which is schematic illustrations of timing diagrams of the pulses generated by gated light source 104 (FIGS. 1A and 1B) in a single frame, in accordance with another embodiment of the disclosed technique. FIG. 4 is referred to also with reference to FIG. 1A. Pulses $190_1, 190_2, \ldots, 190_N$, are generated by gated light source 104 during Frame 1. Time periods $194_1, 194_2, \ldots, 194_N$ represent the gating periods of pulses $190_1, 190_2, \ldots, 190_N$ respectively. Time periods $192_1, 192_2, \ldots, 192_N$ represent the phases of pulses $190_1, 190_2, \ldots, 190_N$ within gating periods $194_1, 194_2, \ldots, 194_N$ respectively. The durations of phases $192_1, 192_2, \ldots, 192_N$ are different from each other. As mentioned above, processor 110 either randomly determines phases $192_1, 192_2, \ldots, 192_N$ or cyclically increases the phase determines phases $192_1, 192_2, \ldots, 192_N$.

Figure 5:
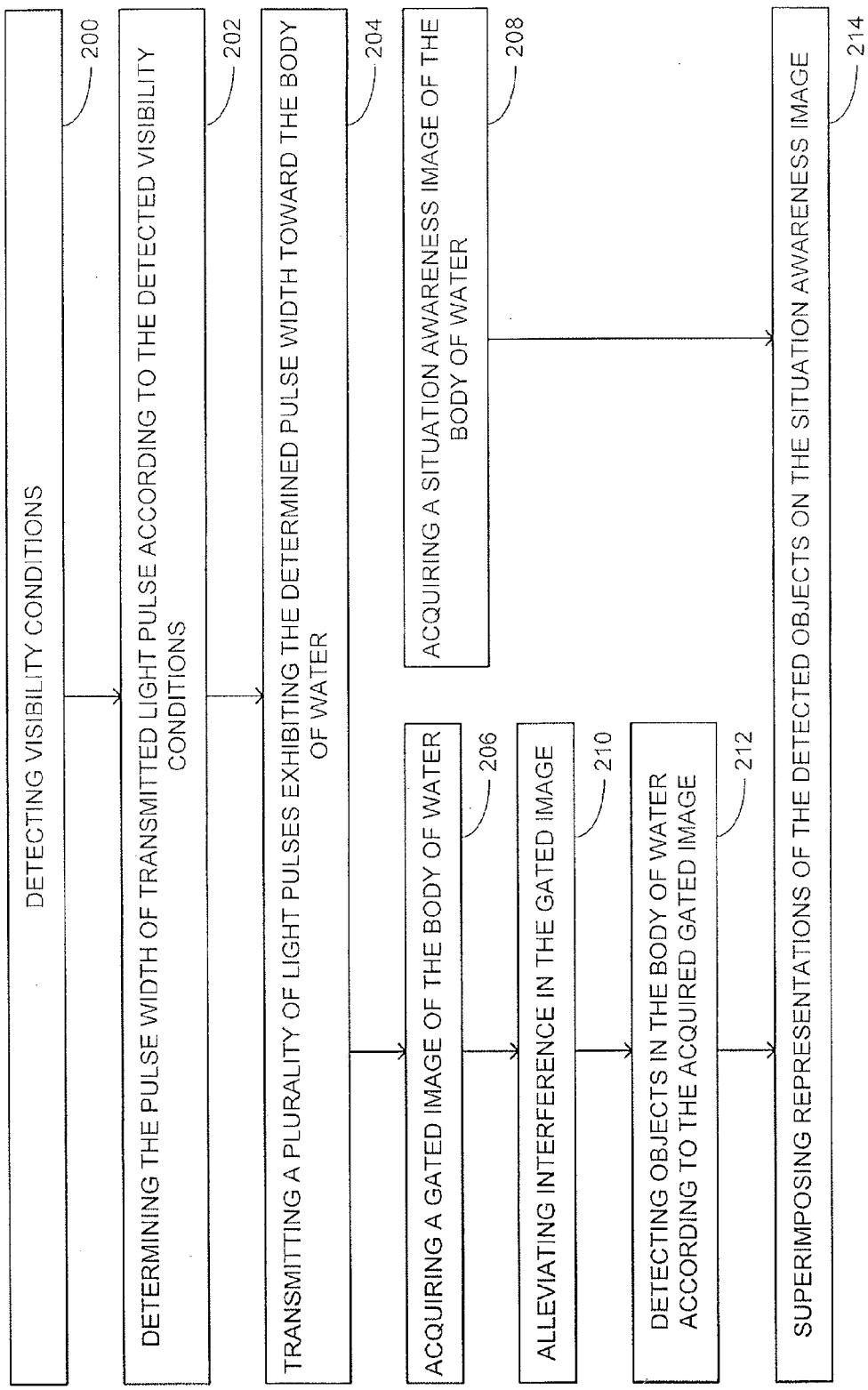
FIG. 5 is a schematic illustration of a method for detecting objects protruding from the surface of a body of water in a marine environment, under low or intermediate illumination conditions, operative in accordance with a further embodiment of the disclosed technique.

Reference is now made to FIG. 5, which is a schematic illustration of a method for detecting objects protruding from the surface of a body of water in a marine environment, under low or intermediate illumination conditions, operative in accordance with a further embodiment of the disclosed technique. In procedure 200, visibility conditions are detected. According to one alternative, the visibility conditions are determined by analyzing an acquired image around a region of interest in the image, and determining a value corresponding to the contrast between objects and background in the image. According to another alternative, the visibility conditions are determined according to input from a user. With reference to FIG. 1B, illumination and visibility conditions determinator 112 determines the visibility conditions.

In procedure 202 the pulse width of transmitted light pulse are determined according to the detected visibility conditions. As the visibility conditions deteriorate (e.g., due to fog, haze, rain, dust, smoke and the like), both the duty cycle of the light pulse and the 'ON' time-period of the camera are shortened. With reference to FIG. 1B, Processor 110 determines the pulse widths of the transmitted pulses.

In procedure 204, a plurality of light pulses, exhibiting the determined pulse widths are transmitted toward the body of water. With reference to FIG. 1B, gated light source 104 transmits a plurality of light pulses exhibiting the determined pulse widths toward body of water 116.

In procedure 206, a gated image of the body of water is acquired. With reference to FIG. 1B, gated camera 106 acquires a gated image of the body of water. After procedure 206, the method proceeds to procedure 210.

In procedure 208, situation awareness image of the body of water is acquired. This situation awareness image is, for example, an infrared image (e.g., either in the 3 to 5 micrometer band or in the 8-12 micrometer band), an ultraviolet image or a RADAR image produced by a RADAR. With reference to FIG. 1B, situation awareness camera 108 acquires a situation awareness image. After procedure 208, the method proceeds to procedure 214.

In procedure 210, interferences in the gated image are alleviated. For example, waves may reflect the transmitted light pulses back toward the gated camera resulting in an image of the waves. Therefore, the motion the representations of the received reflections are tracked and representations exhibit substantially the same motion pattern between the acquired gated images are identified. Alternatively, the motion pattern of the waves is determined. Motion of an identified object in the gated image is tracked and compared to the motion pattern of the waves. When the motion pattern of the object substantially differs from the motion pattern of the waves, the tracked object is determined as an object in the body of water. Conversely, when the motion of the tracked object is substantially similar to the motion pattern of the waves, then, that tracked object is determined as corresponding to a wave. Furthermore, light originating from external light sources may either propagate directly toward the gated camera or reflect from body of water toward the gated camera. These reflections may be miss-detected as corresponding to objects protruding from the surface of the water. Therefore, a visual image of the body of water is acquired. Corresponding segments in the gated image and the visual image are identified and determined as corresponding to reflections of light originating from the external light sources. Alternatively, two segments in the visual image are identified. The first segment being a segment, which generally defines a line perpendicular to the horizon line and the second segment, which is located on that line. This second segment is identified as the external light source. According to yet another alternative, a gated image is acquired when no light pulse is transmitted. Representations of objects, appearing in this acquired image are determined to be light originating from external light sources. With reference to FIG. 1B, processor 112 alleviated interferences in the acquired gated images.

In procedure 212, objects in the body of water are detected according to the gated image. When an object is present in the body of water and protrudes from the surface thereof, then, the transmitted light pulses reflects off the object back toward the gated camera. Thus, gated image includes a representation of the object. With reference to FIG. 1B, processor 112 detects objects in the body of water according to the acquired gated image.

In procedure 214, representations of the detected objects are superimposed on the situation awareness image. With reference to FIG. 1B, processor 110 superimposes a representation of the detected objects on the situation awareness image.

Figure 6:
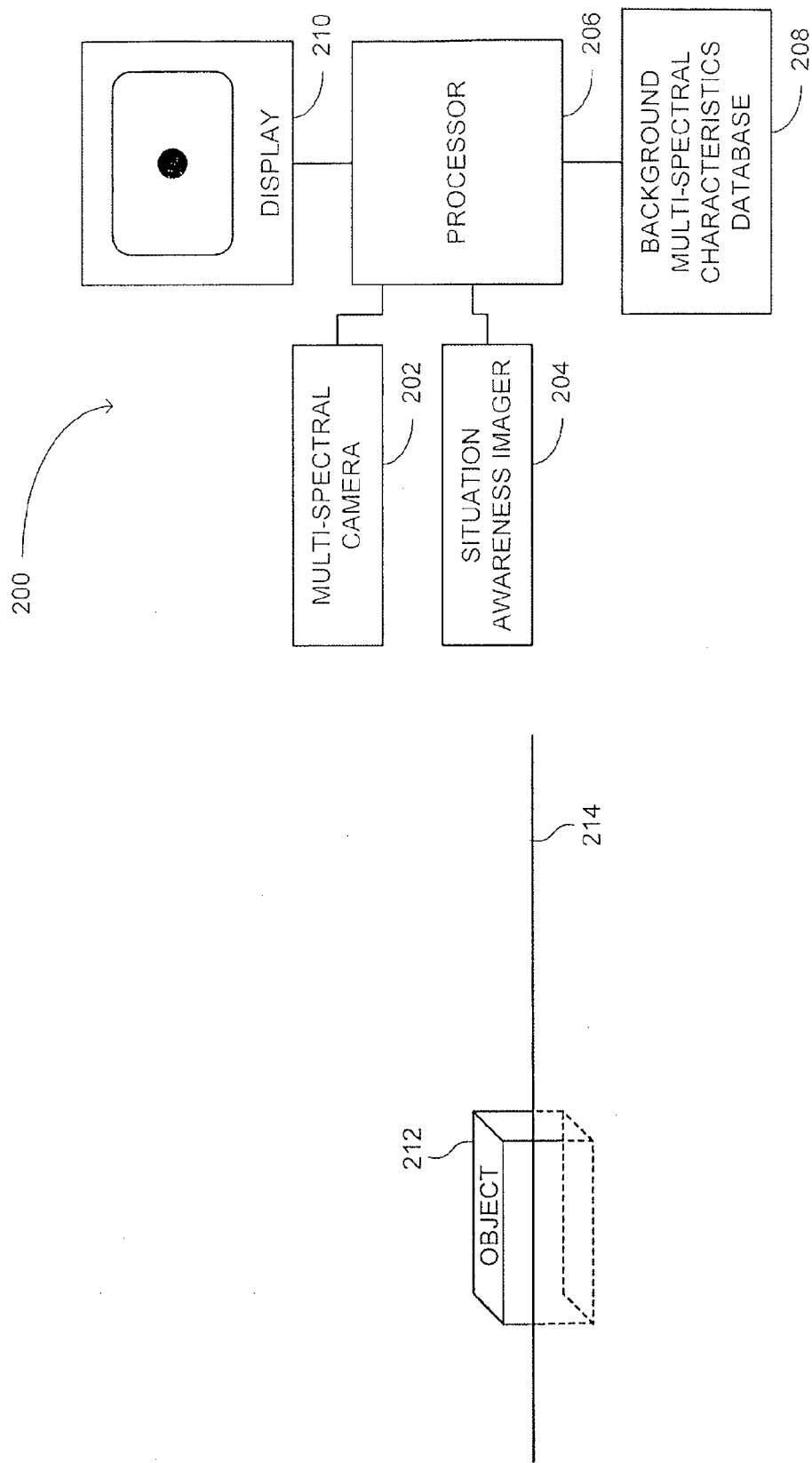
FIG. 6 is a schematic illustration of a system for detecting semi-submerged or floating objects in a marine environment under high or intermediate illumination conditions, constructed and operative in accordance with another embodiment of the disclosed technique.

Reference is now made to FIG. 6 which is a schematic illustration of a system, generally referenced 250, for detecting objects protruding the surface of a body of water (e.g., semi-submerged, or floating obstacles or objects), in a marine environment under high or intermediate illumination conditions, constructed and operative in accordance with a further embodiment of the disclosed technique. System 250 includes a multi-spectral camera 252, a situation awareness imager 254, a processor 256, a background multi-spectral characteristics database 258 and a display 260. Multi-spectral camera 252, situation awareness imager 254, background multi-spectral signatures database 258 and display 260 are all coupled with processor 256. Multi-spectral camera 252 includes a plurality of sensors, each sensitive to a respective spectral band. Situation awareness image 254 is, for example, visual camera (e.g., a digital video camera) sensitive to in the visible spectral band. Situation awareness imager 254 is alternatively an infrared imager (e.g., a forward Looking Infrared (FLIR) imager operating in either the 3 to 5 micrometer band or in the 8-12 micrometer band). Situation awareness imager 254 may further be an ultraviolet camera. Situation awareness imager 254 may also be a RADAR and the situation awareness image is, thus, an image produced by this RADAR.

Background multi-spectral characteristics database 258 includes a multi-spectral characteristics of the body of water. These multi-spectral characteristics include, for example, at least one typical multi-spectral signature of a body of water in which system 250 typically operates. The multi-spectral signature of a body of water are determined, for example, by acquiring a reference multi-spectral image of the body of water when no objects are present in the body of water and determining the spectral composition of the image, or parts thereof. Alternatively, the multi-spectral characteristics is, for example, basis vectors which span the spectrum of the body of water (e.g., determined according to Principal Component Analysis) of the reference image or parts thereof. Processor 256 may automatically determines the multi-spectral characteristics of body of water 264 according to the reference image. It is noted that processor 256 may determine the multi-spectral characteristics of the body of water from a real time image (i.e., provided that no objects appear in this image or that the objects are substantially small). Furthermore, processor 256 periodically updates multi-spectral characteristics database 258.

Under high illumination conditions, multi-spectral camera 252 acquires a multi-spectral image of the body of water and provides the image to processor 256. Processor 256 determines the spectral characteristics of each pixel in the multi-spectral image. According to one alternative, processor 256 determines the spectral signature (i.e., spectral composition) of each pixel in the image and then compares this spectral composition to the background multi-spectral signatures stored in background multi-spectral characteristics database 258. When processor 256 identifies a pixel with a spectral signature which does not match one of the spectral signatures stored in background spectral characteristics database 258, then processor 256 identifies that that pixel potentially corresponds to an object (e.g., object 262) or a part thereof. According to another alternative, processor 256 attempts to define each pixel as a linear combination of the basis vectors stored in multi-spectral characteristics database 258. When processor 256 fails to define a pixel as a linear combination of the basis vectors, then, processor 256 identifies that that pixel potentially corresponds to object 262, or a part thereof. Processor 256 determines representations of the objects protruding from the surface of the body of water according to the pixels identified as corresponding to at least a part of object 262 and may provide an image of a representation of the detected object to display 260. Display 260 displays this image to the user.

Situation awareness imager 254 acquires an image of the surroundings of system 250 (i.e., a situation awareness image). Processor 256 registers the image acquired by multi-spectral camera 252 and the situation awareness. Processor 256 superimposes the representation of object 262 identified in the image acquired by multi-spectral camera 252 on the situation awareness acquired by situation awareness imager 254. Thus, the user can view a representation of object 262 relative to the surroundings. Processor 256 may further produce an audio, tactile or visual warning to the user when an object is detected in the multi-spectral image acquired by multi-spectral camera 252. System 250 may further includes a millimeter wave camera (a millimeter wave camera (not shown in FIG. 5). Representations of objects in body of water 264 will appear in an image acquired by the millimeter wave camera thereby reducing the probability of miss detection of objects.

Figure 7:
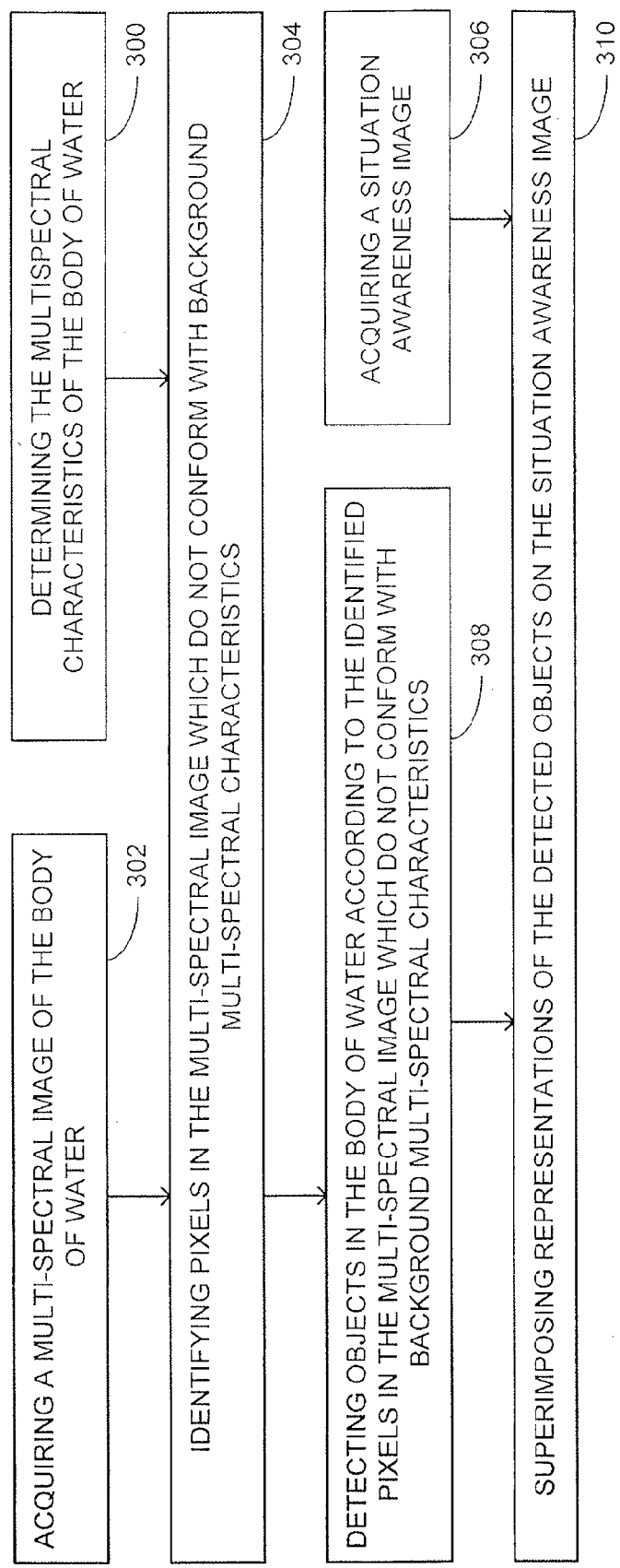
FIG. 7 is a schematic illustration of a method for detecting objects protruding the surface of a body of water, in a marine environment under high or intermediate illumination conditions, operative in accordance with a further embodiment of the disclosed technique.

Reference is now made to FIG. 7, which is a schematic illustration of a method for detecting objects protruding the surface of a body of water, in a marine environment under high or intermediate illumination conditions, operative in accordance with a further embodiment of the disclosed technique. In procedure 300, multi spectral characteristics of the body of water are determined. These multi-spectral characteristics include, for example, at least one typical multi-spectral signature of a body of water. The multi-spectral signature of a body of water are determined, for example, by acquiring a reference multi-spectral image of the body of water when no objects are present in the body of water and determining the spectral composition of the image, or parts thereof. Alternatively, the multi-spectral characteristics is, for example, basis vectors which span the spectrum of the body of water of the reference image or parts thereof. The multi-spectral characteristics of the body of water may be determined according to a reference or a real-time image of the body of water. Furthermore, multi-spectral characteristics may be periodically updated. With reference to FIG. 6, processor 256 determines the multi-spectral characteristics of body of water 264 and stores these multi-spectral characteristics in background multi-spectral characteristics database 258. After procedure 300, the method proceeds to procedure 304.

In procedure 302, multi-spectral image of the body of water is acquired. With reference to FIG. 6, multi-spectral camera 252 acquires a multi-spectral image of the body of water In procedure 304, pixels in the multi-spectral image which do not conform with the background multi-spectral characteristics are identified. According to one alternative, the spectral signature of each pixel in the image is determined and then compared this spectral composition to the stored background multi-spectral signatures. When a pixel with a spectral signature which does not match one of the stored spectral signatures, that that pixel is identified as potentially corresponding to an object or a part thereof.

According to another alternative, an attempt to define each pixel as a linear combination of the basis vectors is made. When this attempt fails, then, that that pixel is identified as potentially corresponding to an object. With reference to FIG. 6, processor 256 identifies pixels in the multi-spectral image, which do not conform with the background multi-spectral characteristics. After procedure 306, the method proceeds to procedure 308.

In procedure 306, a situation awareness image is acquired. As mentioned above, this situation awareness image may be a visual, infrared, RADAR of millimeter wave image. With reference to FIG. 6, situation awareness 204 acquires a situation awareness image. After procedure 306, the method proceeds to procedure 310.

In procedure 308, objects in the body of water are detected according to the identified pixels in the multi-spectral image, which do not conform with background multi-spectral characteristics. With reference to FIG. 6, processor 256 detects object in the body of water according to the identified pixels in the multi-spectral image, which do not conform with background multi-spectral characteristics In procedure 310, representations of the detected objects are superimposed on the situation awareness image. With reference to FIG. 6, processor 256 superimposes representations of the detected objects on the situation awareness image.

Figure 8:
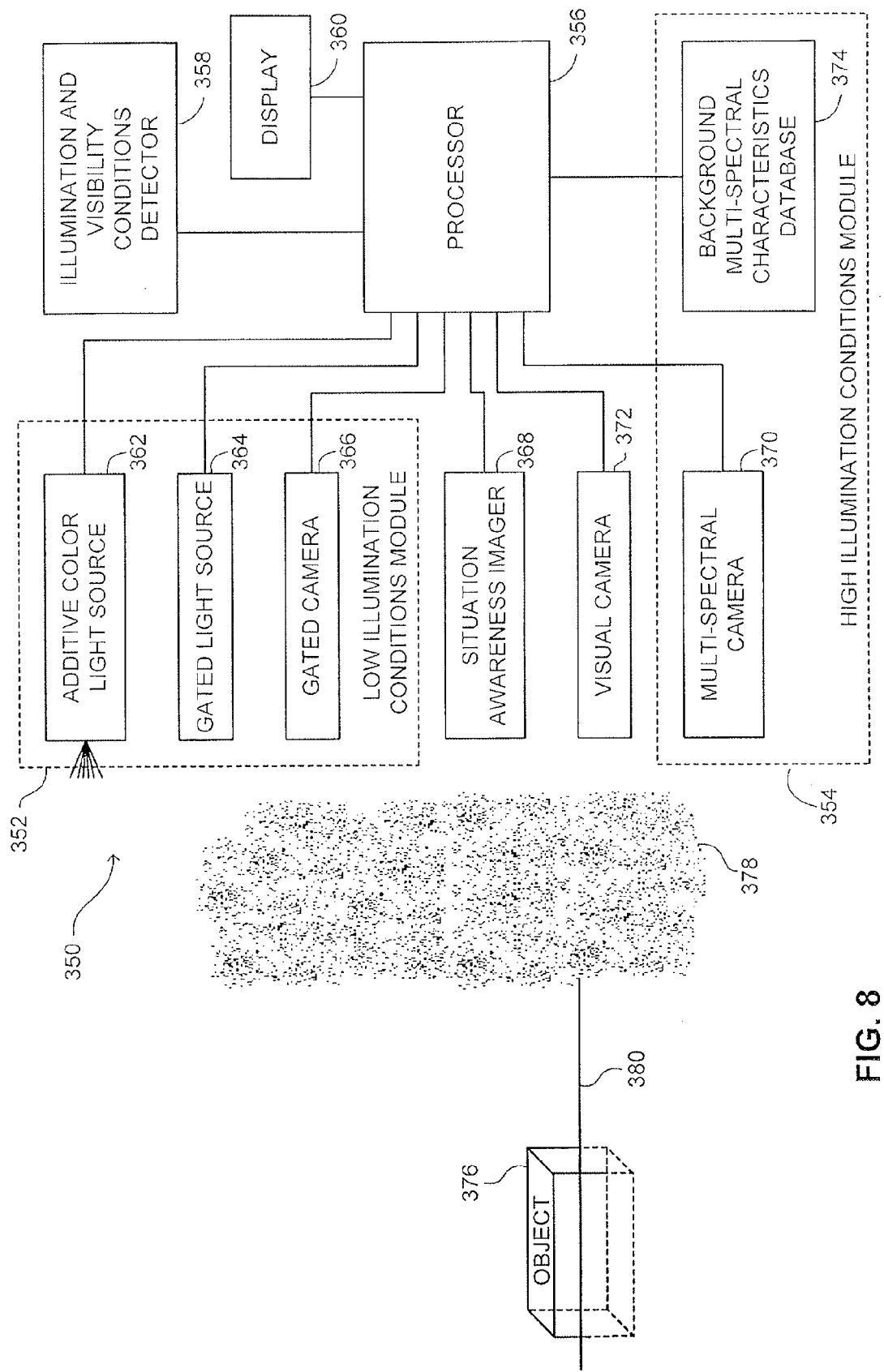
FIG. 8 is a schematic illustration of a system for detecting semi-submerged and floating objects in a marine environment under low illumination or bad visibility conditions, during high illumination and good visibility conditions, as well as under intermediate illumination conditions, constructed and operative in accordance with another embodiment of the disclosed technique.

Reference is now made to FIG. 8, which is a schematic illustration of a system, generally referenced 350, for detecting objects protruding from the surface of a body of water (e.g., semi-submerged, or floating obstacles or objects), in a marine environment under low or intermediate illumination or bad visibility conditions, under high illumination and good visibility conditions, as well as under intermediate illumination conditions, constructed and operative in accordance with another embodiment of the disclosed technique. System 350 includes a low illumination conditions module 352, a high illumination conditions module 354, a situation awareness imager 368, a visual camera 372 sensitive in the visible spectral band, a processor 356, an illumination and visibility conditions detector 358 and a display 360. Low illumination conditions module 352 includes an additive color light source 362, a gated light source 364 and a gated camera 366. High illumination conditions module 354 includes a multi-spectral camera 370 and a background multi-spectral characteristics database 374. Illumination and visibility conditions detector 358 and display 360 are coupled with processor 356. Additive color light source 362, gated light source 364, gated camera 366, infrared imager 368, multi-spectral camera 370, visual camera 372 and background multi-spectral characteristics database 374 are also coupled with processor 356. Gated light source 364 generates a beam of light pulses that illuminate substantially the entire FOV. Furthermore, gated light source 364 generates a beam of light pulses at a specified amplitude and wavelength that does not blind a human observer (e.g., the wavelength of the light is between 800 and 830 nanometers). Gated camera 366 includes, for example, a CCD, a GICID, a GICCD, or a GIAPS, GCMOS, EBCMOS, APD or PV device sensitive to the wavelength of the light generated by gated light source 364. Situation awareness imager 368 is, for example, an infrared imager (e.g., a FLIR imager operating in either the 3 to 5 micrometers band or the 8-12 micrometer band). Situation awareness imager 108 may further be an ultraviolet camera. Situation awareness imager 368 may also be a RADAR.

Illumination and visibility conditions detector 358 detects the illumination and visibility conditions in the vicinity of system 350. For example, illumination and visibility conditions detector 358 includes a light sensor (not shown) sensing the light in the vicinity of system 350 (e.g., a LUX meter detecting the illuminance in the vicinity of system 350). When illumination and visibility conditions detector 358 detects low illumination conditions, processor 356 detects objects protruding from the surface of the body of water by employing bad low illumination conditions module 352. Similarly to system 100 described above in conjunction with FIGS. 1A and 1B, gated light source 364 generates a beam of light pulses toward the body of water. Gated light source 364 generates light at a specified spectral band. When an object, such as object 376 is present in the body of water and protrudes from the surface thereof, then the beam of light pulses impinges on object 376. The light diffusively reflects off object 376 back toward system 350. Processor 356 gates gated camera 366 to be set 'OFF' for at least the time duration it takes gate light source 364 to produce a light pulse, in addition to the time it takes the end light pulse to complete traversing a determined distance from system 350 (i.e., the distance, $D_1$, at which it is required to start detecting objects in the body of water), and back to gated camera 366 (i.e., the 'OFF' time period is twice $D_1$ divided by the speed of light). Thereafter, for each light pulse, processor 356 gates camera 366 to be set 'ON' for an 'ON' time duration, in which the light, reflected back from object 376, is received by gated camera 366. Thus, gated camera 366 receives the energy of light reflected from object 376. Processor 356 determines the width of the light pulse, and thus the time duration of the gating of camera 366, according to the visibility conditions between the system and the object determined by illumination and Visibility conditions determinator 358.

The gated image, acquired by gated camera 366, includes a representation of object 376 due to the received reflections of light of the light pulses reflected from object 376. Processor 356 receives the gated image from gated camera 366 and displays the image on display 360. Processor 356 may further produce an audio or tactile warning to the user when an object is detected in the image acquired by gated camera 366. Situation awareness Imager 368 acquires a situation awareness image of the surroundings of system 350. Processor 356 registers the gated image, acquired by gated camera 366, with the situation awareness image acquired by situation awareness imager 368. Since the gated image does not include representations of the surroundings of object 376 (i.e., the surrounding of object 120 in the gated image are dark), processor 356 superimposes the representation of object 376, present in the gated image, on the situation awareness image. Thus, the user can view a representation corresponding to object 376 relative to the surroundings. Processor 356 may superimpose on the situation awareness image only the section in the image acquired by gate camera 366 where processor 356 detects objects (i.e., the superposition of the image acquired by the gated camera on the image of the surroundings may be a weighted superposition). Furthermore, processor 356 uses the situation awareness image to identify the horizon line similarly to processor 110 as described above in conjunction with FIGS. 1A and 1B. Thus, processor 356 may determined that the light was reflected from an object above the horizon line and thus that object is not an object on interest.

Low illumination conditions module 352 has two modes of operation, observation mode and detection mode. During operation in the observation mode, low illumination conditions module 352 attempts to identify probable objects at large depth of field (e.g., on the order of several kilometers).

Thus, processor 356 determines either the light pulse width, the 'ON' time duration of the gated camera or both (i.e., not necessarily by the same proportions) to the result in the required large Depth of Field. During operation in the detection mode, low illumination conditions module 352 detects objects at small depth of field (e.g., on the order of hundreds of meters). Thus, processor 356 decreases either the light pulse width, the 'ON' time duration of the gated camera or both to result in the required small depth of field.

When waves exist in body of water 380, system 350 may miss detect these waves with foam as corresponding to an object protruding from the surface of the body of water 380 (i.e., since these waves reflect the light generated by gated light source 364 back toward gated camera 366). Processor 356 identifies that reflections correspond to reflection from waves similarly to processor 110 as described above in conjunction with FIGS. 1A and 1B.

When the environment of system 350 includes an external light source or sources the light originating from these external light sources may reflect from body of water 380 toward system 350. These reflections may be received by gated camera 366 (i.e., when the light originating from the light sources includes similar wavelengths to the wavelengths of light gated source 364) and processor 356 may determine that these reflections correspond to objects protruding from the surface of the water. To reduce the probability of processor 356 miss detecting these reflects as objects protruding from the surface of the water, visual camera 372 acquires an image of body of water 384. Processor 356 registers this visual image with the gated image, acquired by gated camera 366, and identifies segments in the gated image which have corresponding segments in the visual image (i.e., acquired by the visual camera 372). Processor 356 determines these segments as corresponding to reflections of light originating from the external light sources in the surroundings of system 350. Alternatively, processor 356 identifies a segment in the visual image as corresponding to reflections of light originating from the external light sources by identifying two segments, in the visual image. The first segment being a segment, which generally defines a line perpendicular to the horizon line and the second segment being substantially a round segment, which is located on that line. The substantially round segment is identified as the external light source. According to yet another alternative, the gated image acquires an image when no light pulse is transmitted. Representations of objects, appearing in this acquired image are determined to be light originating from external light sources. To reduce the probability of miss detection, processor 356 may combine the above two methods.

When it is desired to conceal the light emitted by gated light source 364, additive color light source 362 emits light, at a wavelength different than the wavelength of the light emitted by gated light source 364 and at a relative intensity (i.e., relative to the sensitivity of the human eye) that will render that light invisible to the observer. Furthermore, to reduce the probability that the gated camera of another system acquires an image of the light emitted by gated light source 364, processor 356 randomly determines the phases of the pulses transmitted during each frame or the polarization state thereof (i.e., similarly to processor 110 as described above in conjunction with FIGS. 1A and 1B).

When illumination and visibility conditions detector 358 detects high illumination conditions, processor 356 detects objects protruding from the surface of the body of water by employing high illumination conditions module 354. Similarly to system 200 described above in conjunction with FIG. 4, background multi-spectral characteristics database 374 includes a multi-spectral characteristics of the body of water. This multi-spectral characteristics include, for example, at least one typical multi-spectral signature of a body of water in which system 350 typically operates. Alternatively, the multi-spectral characteristics include, for example, multi-spectral signature database 374 includes basis vectors, which span the spectrum of the body of water. Processor 356 may automatically determines the multi-spectral characteristics of body of water 380. It is noted that processor 206 may determine the multi-spectral characteristics of the body of water from a real time image (i.e., provided that no objects appear in this image or that the objects are substantially small). Furthermore, processor 356 periodically updates multi-spectral signature database 378.

Under high illumination conditions, multi-spectral camera 370 acquires a multi-spectral image of the body of water and provides the image to processor 356. Processor 356 determines the spectral characteristics of each pixel in the multi-spectral image. According to one alternative, processor 356 determines the spectral signature of each pixel in the image and then compares this spectral composition to the background multi-spectral characteristics stored in background multi-spectral signatures database 374. When processor 356 identifies a pixel with a spectral signature that does not match one of the spectral signatures stored in the background multi-spectral signature database 374, then, processor 356 identifies that that pixel potential corresponds to object 376 or a part thereof. Alternatively, processor 356 attempts to define each pixel as a linear combination of the basis vectors stored in multi-spectral characteristics database 374. When processor 356 fails to define a pixel as a linear combination of the basis vectors, then, processor 356 identifies that that pixel potentially corresponds to object 376, or a part thereof. Processor 206 further determines representations of the objects protruding from the surface of the body of water according to the pixels identified as corresponding to at least a part of object 376. Processor 356 determines representations of the objects protruding from the surface of the body of water according to the pixels identified as corresponding to at least a part of object 376 and may provide an image of a representation of the detected object to display 360. Display 360 displays this image to the user.

Visual camera 372 or situation awareness imager 368 acquires an image of the surroundings of system 350 (i.e., a situation awareness image). This situation awareness image may be, for example, a visual image, an infrared image, an ultraviolet image or a RADAR image (i.e., produced by a RADAR). Processor 356 registers the multi-spectral image, acquired by multi-spectral camera 370, and the situation awareness image. Processor 356 superimposes the representation of object 376 identified in the multi-spectral on the situation awareness image. Thus, the user can view object 376 relative to the surroundings. Furthermore, processor 356 may further produce an audio or tactile warning to the user when an object is detected in the multi-spectral image acquired by multi-spectral camera 202. System 350 may further include a millimeter wave camera (not shown in FIG. 6) operative under all illumination and visibility conditions. Representation of objects protruding from the surface of body of water 380 will appear in an image acquired by the millimeter wave camera thereby reducing the probability of miss detection of objects.

When illumination and visibility conditions detector 358 detects intermediate illumination conditions, processor 356 detects objects protruding from the surface of the body of water by employing both low illumination conditions module 352 and high illumination conditions module 354. Processor 356 determines representations of the objects protruding from the surface of the body of water according to both a multi-spectral image and a gated image and superimposes these representations on a situation awareness image acquired by situation awareness imager 368.

Figure 9:
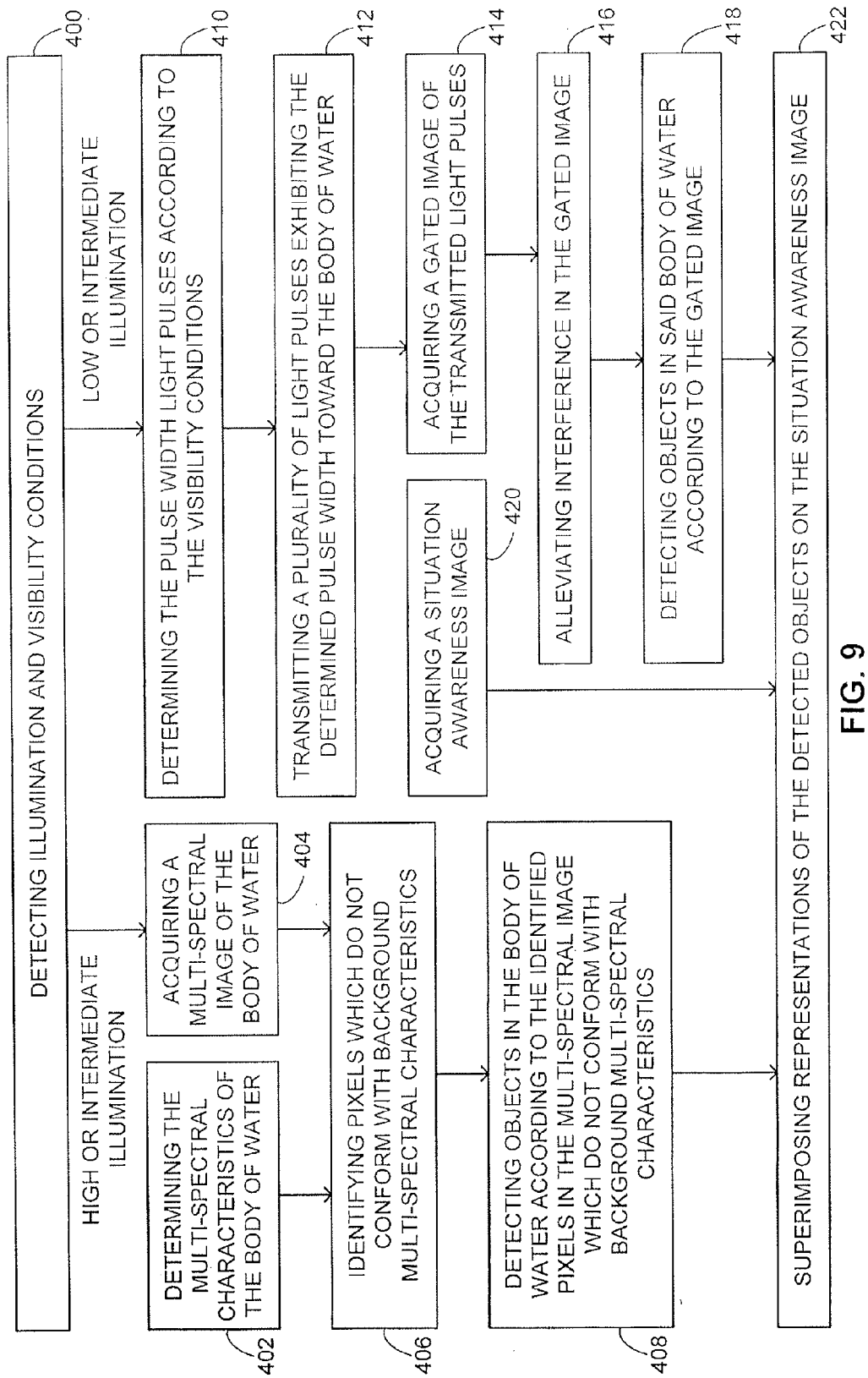
FIG. 9 is a schematic illustration of a method for detecting objects protruding from the surface of a body of water, in a marine environment under low illumination or bad visibility conditions, under high illumination and good visibility conditions, as well as under intermediate illumination conditions, operative in accordance with a further embodiment of the disclosed technique.

Reference is now made to FIG. 9, which is a schematic illustration of a method for detecting objects protruding from the surface of a body of water, in a marine environment under low illumination or bad visibility conditions, under high illumination and good visibility conditions, as well as under intermediate illumination conditions, operative in accordance with a further embodiment of the disclosed technique. In procedure 400, illumination and visibility conditions are detected. According to one alternative, the visibility conditions are determined by analyzing an acquired image acquired around a region of interest in the image, and determining a value corresponding to the contrast between objects and background in the image. According to another alternative, the illumination and visibility conditions are determined according to input from a user. With reference to FIG. 8, illumination and visibility conditions determinator 358 determines the visibility conditions. When high or intermediate illumination conditions are detected the method proceeds to procedure 404. When low or intermediate illumination conditions are detected the method proceeds to procedure 410.

In procedure 402, multi spectral characteristics of the body of water are determined. These multi-spectral characteristics include, for example, at least one typical multi-spectral signature of a body of water. The multi-spectral signature of a body of water are determined, for example, by acquiring a reference multi-spectral image of the body of water when no objects are present in the body of water and determining the spectral composition of the image, or parts thereof. Alternatively, the multi-spectral characteristics is, for example, basis vectors which span the spectrum of the body of water of the reference image or parts thereof. The multi-spectral characteristics of the body of water may be determined according to a reference or a real-time image of the body of water. Furthermore, multi-spectral characteristics may be periodically updated. With reference to FIG. 8, processor 356 determines the multi-spectral characteristics of body of water 380 and stores these multi-spectral characteristics in background multi-spectral characteristics database 374. After procedure 402, the method proceeds to procedure 406

In procedure 404, multi-spectral image of the body of water is acquired. With reference to FIG. 8, multi-spectral camera 370 acquires a multi-spectral image of the body of water In procedure 406, pixels in the multi-spectral image which do not conform with the background multi-spectral characteristics are identified. According to one alternative, the spectral signature of each pixel in the image is determined and then compared this spectral composition to the stored background multi-spectral signatures. When a pixel with a spectral signature which does not match one of the stored spectral signatures, that that pixel is identified as potentially corresponding to an object or a part thereof. According to another alternative, an attempt to define each pixel as a linear combination of the basis vectors is made. When this attempt fails, then, that that pixel is identified as potentially corresponding to an object. With reference to FIG. 8, processor 356 identifies pixels in the multi-spectral image, which do not conform with the background multi-spectral characteristics.

In procedure 408, objects in the body of water are detected according to the identified pixels in the multi-spectral image, which do not conform with background multi-spectral characteristics. With reference to FIG. 8, processor 356 detects object in the body of water according to the identified pixels in the multi-spectral image, which do not conform with background multi-spectral characteristics. After procedure 408, the method proceeds to procedure 422.

In procedure 410 the pulse width of transmitted light pulse are determined according to the detected visibility conditions. As the visibility conditions deteriorate (e.g., due to fog, haze, rain, dust, smoke and the like), both the duty cycle of the light pulse and the 'ON' time period of the camera are shortened. With reference to FIG. 8, Processor 356 determines the pulse widths of the transmitted pulses.

In procedure 412, a plurality of light pulses, exhibiting the determined pulse widths are transmitted toward the body of water. With reference to FIG. 8, gated light source 364 transmits a plurality of light pulses exhibiting the determined pulse widths toward body of water 380.

In procedure 414, a gated image of the body of water is acquired. With reference to FIG. 8, gated camera 366 acquires a gated image of the body of water. After procedure 206, the method proceeds to procedure 210.

In procedure 416, interferences in the gated image are alleviated. Fore example, waves may reflect the transmitted light pulses back toward the gated camera resulting in an image of the waves. Therefore, the motion the representations of the received reflections are tracked and representations exhibit substantially the same motion pattern between the acquired gated images are identified. Alternatively, the motion pattern of the waves is determined. Motion of an identified object in the gated image is tracked and compared to the motion pattern of the waves. When the motion pattern of the object substantially differs from the motion pattern of the waves, the tracked object is determined as an object in the body of water. Conversely, when the motion of the tracked object is substantially similar to the motion pattern of the waves, then, that tracked object is determined as corresponding to a wave. Furthermore, light originating from external light sources may either propagate directly toward the gated camera or reflect from body of water toward the gated camera. These reflections may be miss-detected as corresponding to objects protruding from the surface of the water. Therefore, a visual image of the body of water is acquired. Corresponding segments in the gated image and the visual image are identified and determined as corresponding to reflections of light originating from the external light sources. Alternatively, two segments in the visual image are identified. The first segment being a segment, which generally defines a line perpendicular to the horizon line, and the second segment, which is located on that line. This second segment is identified as the external light source. According to yet another alternative, a gated image is acquired when no light pulse is transmitted. Representations of objects, appearing in this acquired image are determined to be light originating from external light sources. With reference to FIG. 8, processor 356 alleviated interferences in the acquired gated images.

In procedure 418, objects in the body of water are detected according to the gated image. When an object is present in the body of water and protrudes from the surface thereof, then, the transmitted light pulses reflects off the object back toward the gated camera. Thus, gated image includes a representation of the object. With reference to FIG. 9, processor 356 detects objects in the body of water according to the acquired gated image. After procedure 418, the method proceeds to procedure 422.

In procedure 420, situation awareness image of the body of water is acquired. This situation awareness image is, for example, an infrared image (e.g., either in the 3 to 5 micrometer band or in the 8-12 micrometer band), an ultraviolet image or a RADAR image produced by a RADAR. With reference to FIG. 8, situation awareness camera 368 acquires a situation awareness image.

In procedure 222, representations of the detected objects are superimposed on the situation awareness image. With reference to FIG. 8, processor 356 superimposes a representation of the detected objects on the situation awareness image.

It will be appreciated by persons skilled in the art that the disclosed technique is not limited to what has been particularly shown and described hereinabove. Rather the scope of the disclosed technique is defined only by the claims, which follow.

The invention claimed is:

1. A system for detecting objects protruding from the surface of a body of water in a marine environment, said system comprising:
   a gated light source, generating a beam of light pulses toward said body of water during low illumination conditions, at an oblique angle relative to the surface of said body of water, said beam of light pulses illuminating substantially an entire field of view;
   a gated camera, sensitive at least to wavelengths of the light generated by said gated light source, said gated camera acquiring a gated image,
   when at least one object protrudes from said surface of said body of water, said gated camera receives light reflected from said at least one object within said field of view, and said gated image includes a representation of a protruding portion of said at least one object,
   when no objects protrude from said surface of said body of water, a first portion of said beam of light pulses reflects off said surface of said body of water away from said gated camera, a second portion of said beam of light pulses is absorbed by said body of water and said gated image is a dark image;
   a processor, coupled with said gated light source and with said gated camera, said processor gating said gated camera to be set 'OFF' for at least the duration of time it takes said gated light source to produce a light pulse in its substantial entirety, in addition to the time it takes the end of said light pulse to complete traversing a determined distance from said system and back to said gated camera, said processor further setting, for each pulse, said gated camera to be 'ON' for an 'ON' time duration until said light pulse, reflecting back from said object, is received by said gated camera;
   a visibility and illumination conditions determinator, coupled with said processor, said visibility and illumination conditions determinator determining the visibility conditions between said system and an object in said body of water; and
   a situation awareness imager coupled with said processor, said situation awareness imager acquiring a situation awareness image of the surroundings of said system;
   wherein said processor determines the width of said light pulse and said 'ON' time duration of said gated camera, according to the determined visibility conditions between said system and said object,
   wherein said processor shortens said width of said light pulses and said 'ON' time duration, when the visibility conditions between said system and said object deteriorate,
   wherein said processor lengthen said width of said light pulses and said 'ON' time duration, when the visibility conditions between said system and said object improve, and
   wherein said processor superimposes a representation of said object, present in said gated image, on said situation awareness image.

2. The system according to claim 1, wherein said situation awareness imager is a Forward Looking Infrared Imager.

3. The system according to claim 1, wherein said processor registers said gated image and said situation awareness.

4. The system according to claim 3, wherein said processor identifies the horizon line according to said situation awareness image, thereby, said processor determines when said light is reflected from an object above said horizon line.

5. The system according to claim 1 further including:
   a multi-spectral camera, couple with said processor, said multi-spectral camera acquiring multi-spectral images of said body of water during high illumination conditions; and
   a background multi-spectral characteristics database, coupled with said processor, said background multi-spectral characteristics database storing spectral characteristics of said body of water,
   wherein said processor determines the spectral characteristics of each pixel in said multi-spectral image and compares the determined spectral characteristics to the spectral characteristics stored in said background multi-spectral characteristics database, said processor identifies a pixel in said image as corresponding to at least a part of at least one object protruding from said body of water when said processor identifies that the spectral characteristics of said pixel are different from the spectral characteristics of said background, said processor further determining a representation of at least a part of said object according to the identified pixels, and
   wherein said visibility and illumination conditions detector detects the illumination conditions in the vicinity of said system.

6. The system according to claim 5, wherein said situation awareness imager is a visual camera sensitive to light in the visible spectral band,
   wherein said processor registers said situation awareness image with said multi-spectral image, and
   wherein said processor superimposes said representation of said object on said situation awareness image.

7. The system according to claim 5, wherein said spectral characteristics include the spectral signature of the body of water.

8. The system according to claim 5, wherein said spectral characteristics include basis vectors which span the spectrum of said body of water.

9. The system according to claim 5, wherein said processor automatically determines said spectral characteristics according to a reference multi-spectral image of said body of water acquired by said multi-spectral imager.

10. The system according to claim 1, further comprising a visual camera, coupled with said processor, for acquiring visual images in the visible spectral band, said visual camera acquiring a visual image of said body of water said processor registers said visual image with said gated image, wherein said processor identifies segments in said gated image, which do not have corresponding segments in said visual image, thereby determining these segments as corresponding to reflections of light originating from external light sources in the surroundings of said system, and wherein said processor identifies a segment in said visual image as corresponding to reflections of light originating from the external light sources by identifying two segments, in the visual image, that define a line which is perpendicular to said horizon line.

11. The system according to claim 1, wherein said gated camera includes a device selected from the group consisting of:
CCD;
GICID;
GICCD;
GIAPS;
GCMOS;
EBCMOS;
APD; and
PV.

12. The system according to claim 1, wherein said system operates in an observation mode for detecting objects at large range resolutions, and
wherein, when said system operates in said observation mode, said processor increases at least one of said 'ON' tune duration of said gated camera and the width of the light pulse.

13. The system according to claim 1, wherein said system operates in a detection mode for detecting objects at small ranges, and
wherein, when said system operates in said detection mode, said processor decreases at least one of said 'ON' time duration of said gated camera and the width of the light pulse.

14. The system according to claim 1, wherein said processor tracks the motion of the representation of received reflections in a plurality of gated images,
wherein said processor determines said received reflections as corresponding to reflections from waves when said received reflections exhibit substantially the same motion pattern between acquired gated images, and
wherein said processor determines received reflections as corresponding to objects protruding from the surface of said body of water when the motion of the motion of said representations substantially differs from the motion pattern of the waves.

15. The system according to claim 1, further comprising an additive color light source, coupled with said processor, said additive color light source emitting light at a wavelength different than the wavelength of the light emitted by said light source and at a relative intensity that renders said light emitted by said light source invisible to an observer.

16. The system according to claim 1, wherein all the pulses in light pulses generated during each frame, are transmitted at the same random time period within the gating period.

17. The system according to claim 1, wherein said phases of the transmitted pulses, within each frame, are randomly determined.

18. The system according to claim 1, wherein the polarization state of said light pulses is randomly determined and said gated camera acquires images only of light exhibiting said polarization state.

19. A method for detecting objects protruding from the surface of a body of water in a marine environment, said method comprising the procedures of:
detecting visibility and illumination conditions;
determining the pulse width of said light pulses according to said visibility and illumination conditions;
during low illumination conditions, transmitting a beam of light pulses toward said body of water, at an oblique angle relative to the surface of said body of water, said light pulses exhibiting a determined pulse width, said beam of light pulses illuminating substantially an entire field of view;
acquiring a gated image of said transmitted beam of light pulses,
when at least one object protrudes from said surface of said body of water, light reflects from said at least one object within said field of view and said gated image includes a representation of said at least one object,
when no objects protrude from said surface of said body of water, a first portion of said beam of light pulses reflects off said surface of said body of water away from said gated camera, a second portion is absorbed by said body of water and said gated image is a dark image;
detecting objects in said body of water according to said gated image,
wherein said pulse width is shortened when said visibility conditions between said system and said object deteriorate
acquiring a situation awareness image; and
superimposing representations of the detected objects on the situation awareness image, and
wherein said pulse width lengthened when said visibility conditions between said system and said object improve.

20. The method according to claim 19, wherein said situation awareness image is a Forward Looking Infrared image.

21. The method according to claim 20, further including the sub-procedure of identifying the horizon line according to said situation awareness image, thereby determining when said light is reflected from an object above said horizon line.

22. The method according to claim 19, further including the procedures of:
during high illumination conditions, determining multi-spectral characteristics of said body of water;
acquiring a multi-spectral image of said body of water;
identifying pixels which do not conform with background multi-spectral characteristics; and
detecting objects in said body of water according to the identified pixels in the multi-spectral image which do not conform with background multi-spectral characteristics.

23. The method according to claim 22, wherein said situation awareness image is a visual image, and wherein said method further includes the procedure of:
registering said situation awareness image with said multi-spectral image; and
superimposing representations of the detected objects on said situation awareness image.

24. The method according to claim 22, wherein said spectral characteristics include the spectral signature of said body of water.

25. The method according to claim 22, wherein said spectral characteristics include basis vectors which span the spectrum of said body of water.

26. The method according to claim 22, wherein said spectral characteristics are determined according to a reference multi-spectral image of said body of water.

27. The method according to claim 22, wherein said spectral characteristics database is periodically updated.

28. The method according to claim 19, further including the procedures of alleviating interferences in said gated image, said alleviating interferences at least includes identifying segments in said gated image, which do not have corresponding segments in a visual image, thereby determining these segments as corresponding to reflections of light originating from external light sources, and wherein said alleviating interferences further includes identifying a segment in said visual image as corresponding to reflections of light originating from said external light sources by identifying two segments, in the visual image, that define a line which is perpendicular to said horizon line.

29. The method according to claim 19, wherein the motion of representation of received reflections are tracked in a plurality of gated images, wherein said reflections are determined as corresponding to reflections from waves when said received reflections exhibit substantially the same motion pattern between acquired gated images, and wherein said reflections are determined as corresponding to objects protruding from the surface of said body of water when the motion of said representations substantially differs from the motion pattern of the waves.

30. The method according to claim 19, wherein all the pulses in said light pulses, generated during each frame, are transmitted at the same random time period within the gating period.

31. The method according to claim 19, wherein said phases of the transmitted pulses, within each frame, is randomly determined.

32. The method according to claim 19, wherein the polarization state of said light pulses is randomly determined and said gated camera acquires image only of light exhibiting said polarization state.

* * * * *